US011599071B2

(12) United States Patent
Vitullo

(10) Patent No.: US 11,599,071 B2
(45) Date of Patent: Mar. 7, 2023

(54) SYSTEMS AND METHODS FOR ADAPTIVELY TUNING THRESHOLDS FOR FAULT DETECTION IN BUILDINGS

(71) Applicant: Johnson Controls Tyco IP Holdings LLP, Milwaukee, WI (US)

(72) Inventor: Steven R. Vitullo, Milwaukee, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 376 days.

(21) Appl. No.: 16/355,066

(22) Filed: Mar. 15, 2019

(65) Prior Publication Data

US 2019/0302709 A1 Oct. 3, 2019

Related U.S. Application Data

(60) Provisional application No. 62/649,966, filed on Mar. 29, 2018.

(51) Int. Cl.
*G05B 13/04* (2006.01)
*G06F 17/18* (2006.01)
(Continued)

(52) U.S. Cl.
CPC ............ *G05B 13/041* (2013.01); *F24F 11/47* (2018.01); *G05B 13/048* (2013.01); *G06F 17/18* (2013.01); *G06Q 50/06* (2013.01)

(58) Field of Classification Search
CPC ..... G05B 13/041; G05B 13/048; F24F 11/47; G06F 17/18; G06Q 50/06
(Continued)

(56) References Cited

U.S. PATENT DOCUMENTS 8,711,711 B2   4/2014  Kim
9,235,657 B1   1/2016  Wenzel et al.
(Continued)

FOREIGN PATENT DOCUMENTS

CN   102054123 A   5/2011
CN   102859517 A   1/2013
(Continued)

OTHER PUBLICATIONS

Armstrong et al., Error Measures for Generalizing About Forecasting Methods: Empirical Comparisons, International Journal of Forecasting, vol. 8, No. 1, Jun. 1992, 18 pages.
(Continued)

*Primary Examiner* — Rocio Del Mar Perez-Velez
*Assistant Examiner* — Christopher W Carter
(74) *Attorney, Agent, or Firm* — Foley & Lardner LLP

(57) ABSTRACT

A building system including one or more memory devices configured to store instructions that, when executed on one or more processors, cause the one or more processors to determine an average of a minimum half of sorted energy consumption values for a first time period and determine an average of a maximum half of sorted energy consumption values for a second time period. The instructions also cause the processor to determine a ratio of the average of the minimum half of sorted energy consumption values for the first time period to the average of the maximum half of sorted energy consumption values for the second time period, compare the calculated ratio to an adaptively tunable threshold value and activate a system responsive to the calculated ratio exceeding the adaptively tunable threshold value.

18 Claims, 20 Drawing Sheets

(51) Int. Cl.
F24F 11/47 (2018.01)
G06Q 50/06 (2012.01)
(58) Field of Classification Search
USPC .......................................................... 700/29
See application file for complete search history.

(56) References Cited

U.S. PATENT DOCUMENTS

| | | | |
|---|---|---|---|
| 9,507,890 | B2 | 11/2016 | Fei et al. |
| 10,402,360 | B2 | 9/2019 | Cayemberg et al. |
| 2004/0088069 | A1 | 5/2004 | Singh |
| 2008/0179053 | A1 | 7/2008 | Kates |
| 2011/0095897 | A1* | 4/2011 | Sutrave .................. G06Q 50/06 340/635 |
| 2011/0257911 | A1 | 10/2011 | Drees et al. |
| 2013/0103657 | A1* | 4/2013 | Ikawa .................. G06F 16/2477 707/693 |
| 2014/0018940 | A1 | 1/2014 | Casilli |
| 2014/0107850 | A1 | 4/2014 | Curtis |
| 2015/0316902 | A1 | 11/2015 | Wenzel et al. |
| 2015/0316903 | A1 | 11/2015 | Asmus et al. |
| 2015/0316907 | A1 | 11/2015 | Elbsat et al. |
| 2016/0203036 | A1 | 7/2016 | Mezic et al. |
| 2017/0179716 | A1 | 6/2017 | Vitullo et al. |
| 2017/0285591 | A1* | 10/2017 | Menzel .................. G06F 1/266 |
| 2017/0286204 | A1 | 10/2017 | Dibowski et al. |
| 2017/0357225 | A1 | 12/2017 | Asp et al. |
| 2017/0357607 | A1 | 12/2017 | Cayemberg et al. |

FOREIGN PATENT DOCUMENTS

| | | |
|---|---|---|
| CN | 107274300 A | 10/2017 |
| DE | 35 05 600 A1 | 8/1986 |
| DE | 10021498.0 A1 | 11/2000 |
| WO | WO-2017/127373 | 7/2017 |

OTHER PUBLICATIONS

Armstrong et al., On the Selection of Error Measures for Comparisons Among Forecasting Methods, Journal of Forecasting, vol. 14, No. 1, Jan. 1995, 5 pages.
Armstrong, J., Combining Forecasts, in Principles of Forecasting: a Handbook for Researchers and Practitioners, 2001, Kluwer Academic Publishers, Boston, MA, 19 pages.
Armstrong, J., Combining Forecasts: The End of the Beginning or the Beginning of the End?, International Journal of Forecasting, vol. 5, No. 4, Feb. 1989, 5 pages.
Batchelor et al., Forecaster Diversity and the Benefits of Combining Forecasts, Management Science, vol. 41, No. 1, Jan. 1995, 8 pages.
Bates et al., The Combination of Forecasts, Operational Research Quarterly, vol. 20, No. 4, Dec. 1969, 18 pages.
Bishop, C. Pattern Recognition and Machine Learning. Springer. 2006.
Bopp, A., On Combining Forecasts: Some Extensions and Results, Management Science, vol. 21, No. 12, Dec. 1985, 7 pages.
Clemen, R., Combining Forecasts: A Review and Annotated Bibliography, International Journal of Forecasting, vol. 5, No. 4, Jan. 1989, 25 pages.
Dickinson, J.P., Some Comments on the Combination of Forecasts, Operational Research Quarterly, vol. 26, No. 1, Part 2, Apr. 1975, 6 pages.
Gordon et al., Chapter 10: Quasi-Empirical Thermodynamic Model for Chillers in Cool Thermodynamics: The Engineering and Physics of Predictive, Diagnostic and Optimization Methods for Cooling Systems, 2001, Cambridge International Science Publishing, Cambridge, UK, 33 pages.
Gordon et al., Chapter 5: The Fundamental Chiller Model in Terms of Readily-Measurable Variables in Cool Thermodynamics: The Engineering and Physics of Predictive, Diagnostic and Optimization Methods for Cooling Systems, first published Jul. 2000, Cambridge International Science Publishing, Cambridge, UK, 13 pages.
Granger et al., Improved Methods of Combining Forecasts, Journal of Forecasting, vol. 3, No. 2, Apr. 1984, 8 pages.
Jiang et al., Reevaluation of the Gordon-Ng Performance Models for Water-Cooled Chillers, Ashrae Transactions, vol. 109, 2003, 16 pages.
Lee et al, Evaluation of the Suitability of Empirically-Based Models for Predicting Energy Performance of Centrifugal Water Chillers with Variable Chilled Water Flow, Applied Energy, vol. 93, May 2012, 13 pages.
Lee et al., An Evaluation of Empirically-Based Models for Predicting Energy Performance of Vapor-Compression Water Chillers, Applied Energy, vol. 87, No. 11, Nov. 2010, 8 pages.
Smith, D.G.C, Combination of Forecasts in Electricity Demand Predication, Journal of Forecasting, vol. 8, No. 3, Jul. 1989, 8 pages.
Timmerman, A., Forecast Combinations, UCSD, Nov. 1, 2004, 84 pages.
Vitullo et al., Mathematical Models for Natural Gas Forecasting, Canadian Applied Mathematics Quarterly, vol. 17, No. 4, Winter 2009, 22 pages.
Vitullo, S. "Disaggregating Time Series Data for Energy Consumption by Aggregate and Individual Customer," Dissertations (2009-), Paper 169, Marquette University, Dec. 2011, 151 pages.
Winkler et al., The Combination of Forecasts, Journal of the Royal Statistical Society Series A, vol. 146, No. 2, 1983, 8 pages.
Chinese Office Action on CN Appl. No. 201910245344.1 dated Dec. 1, 2021 (18 pages with English language translation).

* cited by examiner

| Customer No. | # Detected | Total Days | True Positives | False Positives | False Negatives | True Negatives | Precision | Recall | F1 |
|---|---|---|---|---|---|---|---|---|---|
| 1 | 10 (3) | 410 | 10 (3) | 0 (0) | 4 (13) | 396 (394) | 1 (1) | 0.7143 (0.1875) | 0.8333 (0.3158) |
| 2 | 24 (1) | 435 | 24 (1) | 0 (0) | 7 (10) | 404 (424) | 1 (1) | 0.7742 (0.0909) | 0.8727 (0.1667) |
| 3 | 5 (4) | 438 | 5 (4) | 0 (0) | 3 (3) | 430 (431) | 1 (1) | 0.625 (0.5714) | 0.7692 (0.7273) |
| 4 | 3 (1) | 391 | 3 (1) | 0 (0) | 1 (3) | 387 (387) | 1 (1) | 0.75 (0.2500) | 0.8571 (0.4000) |
| 5 | 15 (0) | 334 | 15 (0) | 0 (0) | 2 (14) | 317 (320) | 1 (0) | 0.8824 (0) | 0.9375 (0) |
| 6 | 42 (11) | 892 | 42 (11) | 0 (0) | 3 (8) | 847 (873) | 1 (1) | 0.9933 (0.5789) | 0.9966 (0.7333) |
| 7 | 16 (2) | 359 | 14 (2) | 2 (0) | 2 (13) | 341 (344) | 0.875 (1) | 0.875 (0.1333) | 0.875 (0.2353) |
| 8 | 19 (3) | 432 | 19 (3) | 0 (0) | 4 (9) | 409 (420) | 1 (1) | 0.8261 (0.25) | 0.9048 (0.40) |
| 9 | 9 (1) | 776 | 7 (1) | 2 (0) | 1 (10) | 766 (765) | 0.7778 (1) | 0.875 (0.0909) | 0.8235 (0.1667) |
| 10 | 7 (0) | 337 | 7 (0) | 0 (0) | 4 (6) | 326 (331) | 1 (0) | 0.6364 (0) | 0.7778 (0) |
| Mean | | | | | | | 0.9653 (0.8000) | 0.6364 (0.2153) | 0.8648 (0.3145) |

FIG. 10

| Customer No. | # Detected | Total Weeks | True Positives | False Positives | False Negatives | True Negatives | Precision | Recall | F1 |
|---|---|---|---|---|---|---|---|---|---|
| 1 | 5 (0) | 58 | 4 (0) | 1 (0) | 0 (7) | 53 (51) | 0.80 (0) | 1 (0) | 0.8889 (0) |
| 2 | 9 (1) | 61 | 6 (1) | 3 (0) | 1 (10) | 51 (50) | 0.6667 (1) | 0.8571 (0.0909) | 0.75 (0.1667) |
| 3 | 7 (2) | 62 | 2 (2) | 5 (0) | 1 (5) | 54 (55) | 0.2857 (1) | .6667 (0.2857) | .400 (0.4444) |
| 4 | 2 (3) | 56 | 0 (3) | 2 (0) | 0 (0) | 54 (53) | 0 (1) | 0 (1) | 0 (1) |
| 5 | 5 (0) | 47 | 3 (0) | 2 (0) | 0 (3) | 42 (44) | 0.60 (0) | 1 (0) | 0.75 (0) |
| 6 | 14 (4) | 127 | 7 (4) | 7 (0) | 5 (6) | 108 (117) | 0.50 (1) | 0.5833 (0.4000) | 0.5384 (0.5714) |
| 7 | 6 (1) | 50 | 4 (1) | 2 (0) | 3 (6) | 41 (43) | 0.6667 (1) | 0.5714 (0.1429) | 0.6154 (0.2500) |
| 8 | 4 (2) | 61 | 4 (2) | 0 (0) | 1 (2) | 56 (57) | 1 (1) | 0.80 (0.50) | 0.8889 (0.6667) |
| 9 | 11 (3) | 110 | 9 (3) | 2 (0) | 3 (8) | 96 (99) | 0.8182 (1) | 0.75 (0.2727) | 0.7826 (0.4286) |
| 10 | 2 (0) | 47 | 1 (0) | 1 (0) | 0 (2) | 45 (43) | 0.500 (0) | 1 (0) | 0.6667 (0) |
| Mean | | | | | | | 0.5837 (0.7000) | 0.7228 (0.2692) | 0.6281 (0.3528) |

FIG. 11

SYSTEMS AND METHODS FOR ADAPTIVELY TUNING THRESHOLDS FOR FAULT DETECTION IN BUILDINGS

CROSS-REFERENCE TO RELATED PATENT APPLICATION

This application claims the benefit of and priority to U.S. Provisional Patent Application No. 62/649,966 filed Mar. 29, 2018, the entirety of which is incorporated by reference herein.

BACKGROUND

A building management system (BMS) is, in general, a system of devices configured to control, monitor, and manage equipment in or around a building or building area. A BMS can include a controller, a heating, ventilation, and air conditioning (HVAC) system, a security system, a lighting system, a fire alerting system, and any other system that is capable of managing building functions or devices, or any combination thereof. A BMS may include a variety of devices (e.g., HVAC devices, controllers, chillers, fans, sensors, etc.) configured to facilitate monitoring and controlling the building space. Devices can be configured to communicate with other devices via a network, such as a Building Automation and Control network (BACnet) or a Multi-service Transport Platform (MSTP) Network.

Users of BMS systems may have different utility consumption and demand that can vary during different time periods, such as the night time (unoccupied hours for business-type users or occupied for residential type users) compared to during the day time (occupied hours for business-type users or unoccupied for residential type users). For example, some commercial buildings may turn off lighting and HVAC systems in the evening to conserve energy when there is little to no occupancy. Customers who have the ability to monitor unusual changes in their load from day to day can use this information to help determine inefficiencies (or faults) in their energy usage. These energy inefficiencies can lead to energy waste that causes the customer to pay more in utility bills due to increased consumption and demand.

SUMMARY

One implementation of the present disclosure is a building system. The building system includes one or more memory devices configured to store instructions that, when executed on one or more processors, cause the one or more processors to determine an average of a minimum half of sorted energy consumption values for a first time period and determine an average of a maximum half of sorted energy consumption values for a second time period. The instructions also cause the processor to determine a ratio of the average of the minimum half of sorted energy consumption values for the first time period to the average of the maximum half of sorted energy consumption values for the second time period, compare the calculated ratio to an adaptively tunable threshold value, and activate a second system responsive to the calculated ratio exceeding the adaptively tunable threshold value.

In some embodiments, the first time period is an occupancy time period and the second time period is a non-occupancy time period.

In some embodiments, the activated second system controls one or more parameters for controlling components of a HVAC system, one or more building subsystems, or one or more building management system devices.

In some embodiments, the instructions cause the one or more processors to determine a mean of a set of calculated ratios for an interval, determine a median absolute deviation of the calculated ratios for the interval, and set the adaptively tunable threshold value based on the mean and the median absolute deviation.

In some embodiments, the adaptively tunable threshold value is further based on a scaling factor to scale the median absolute deviation based on the mean of the set of calculated ratios.

In some embodiments, the instructions cause the one or more processors to implement: a data collector configured to collect data samples from one or more building management system devices and generate a data timeseries comprising a plurality of the data samples; an analytics service configured to perform one or more analytics using the data timeseries and generate a results timeseries comprising a plurality of result samples indicating results of the analytics; and an energy management application configured to retrieve the data timeseries and the results timeseries from a timeseries database in response to a request for timeseries data associated with one or more variables. The system further includes a timeseries database configured to store the data timeseries and the results timeseries.

In some embodiments, the analytics service includes a weather normalization module configured to generate the results timeseries by removing an effect of weather from the data timeseries.

In some embodiments, the data timeseries is a resource consumption timeseries and the data samples of the data timeseries include at least one of electric consumption values, water consumption values, or natural gas consumption values. The analytics service includes an energy benchmarking module configured to use the data timeseries to calculate an energy usage metric for a building associated with the data timeseries, the energy usage metric comprising at least one of energy usage intensity (EUI) or energy density.

In some embodiments, the instructions further cause the one or more processors to fill one or more gaps in data of the data timeseries using values from a third time period different from the first time period and the second time period.

In some embodiments, the third time period and the first time period are associated with a common characteristic.

In another implementation, a system comprising a building management system in communication with one or more building management system devices of a building network is disclosed. The building management system is configured to determine an average of energy consumption values for a first time period and determine an average of energy consumption values for a second time period. The building management system is also configured to determine a ratio of the average energy consumption values for the first time period to the average of energy consumption values for the second time period; compare the calculated ratio to an adaptively tunable threshold value; and activate a second system responsive to the calculated ratio exceeding the adaptively tunable threshold value.

In some embodiments, the first time period is a weekend time period and the second time period is a weekday time period.

In some embodiments, the activated second system controls one or more parameters for controlling components of a HVAC system, one or more building subsystems, or the one or more building management system devices.

In some embodiments, the building management system is further configured to determine a mean of a set of calculated ratios for an interval; determine a median absolute deviation of the calculated ratios for the interval; and determine the adaptively tunable threshold value based on the mean and the median absolute deviation.

In some embodiments, the adaptively tunable threshold value is further based on a scaling factor to scale the median absolute deviation based on the mean of the set of calculated ratios.

In some embodiments, the building management system includes a data collector configured to collect data samples from the one or more building management system devices and generate a data timeseries comprising a plurality of the data samples; an analytics service configured to perform one or more analytics using the data timeseries and generate a results timeseries comprising a plurality of result samples indicating results of the analytics; and an energy management application configured to retrieve the data timeseries and the results timeseries from the timeseries database in response to a request for timeseries data associated with one or more variables. The building management system further includes a timeseries database configured to store the data timeseries and the results timeseries.

In some embodiments, the analytics service includes a weather normalization module configured to generate the results timeseries by removing an effect of weather from the data timeseries.

In some embodiments, the data timeseries is a resource consumption timeseries and the data samples of the data timeseries include at least one of electric consumption values, water consumption values, or natural gas consumption values. The analytics service includes an energy benchmarking module configured to use the data timeseries to calculate an energy usage metric for a building associated with the data timeseries, the energy usage metric comprising at least one of energy usage intensity (EUI) or energy density.

In some embodiments, the system fills one or more gaps in data of the data timeseries using values from a third time period different from the first time period and the second time period.

In another implementation, a method conducted by a processing circuit of a building management system is disclosed. The method includes collecting, by the processing circuit, data samples from building management system devices of the building management system and generating a data timeseries comprising a plurality of the data samples. The method also includes performing, by the processing circuit, one or more analytics using the data timeseries. The method also includes generating, by the processing circuit, a results timeseries comprising a plurality of result samples indicating results of the analytics and storing, by the processing circuit, the data timeseries and the results timeseries. The method also includes retrieving, by the processing circuit, the data timeseries and the results timeseries from the timeseries database in response to a request for timeseries data associated with the one or more variables and using, by the processing circuit, the samples of the data timeseries to determine an average of a minimum half of sorted energy consumption values for a first time period. The method also includes using, by the processing circuit, the samples of the data time series to calculate an average of a maximum half of sorted energy consumption values for a second time period and determining, by the processing circuit, a ratio of the average of the minimum half of sorted energy consumption values for the first time period to the average of the maximum half of sorted energy consumption values for the second time period. The method also includes comparing, by the processing circuit, the calculated ratio to an adaptively tunable threshold value; and activating, by the processing circuit, a system responsive to the calculated ratio exceeding the adaptively tunable threshold value.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 10 is a night versus day process results table, according to an exemplary embodiment.

FIG. 11 is a weekend versus weekday process results table, according to an exemplary embodiment.

DETAILED DESCRIPTION

Overview

Methods can be used to detect energy waste by looking at the differences between night and day consumption changes. One such method observes a ratio derived from the average of the trough values during unoccupied times compared to the average of the peak values during the occupied time. Additionally, similar techniques can be used for seeing changes in weekend (unoccupied) compared to weekday (occupied) time periods. Finding changes in weekend usage compared to weekday usage and can help customers see trends in demand and consumption. Though the night versus day and weekend versus weekday processes described herein show examples using consumption, these examples can also use demand data or energy density data.

Figure 1:
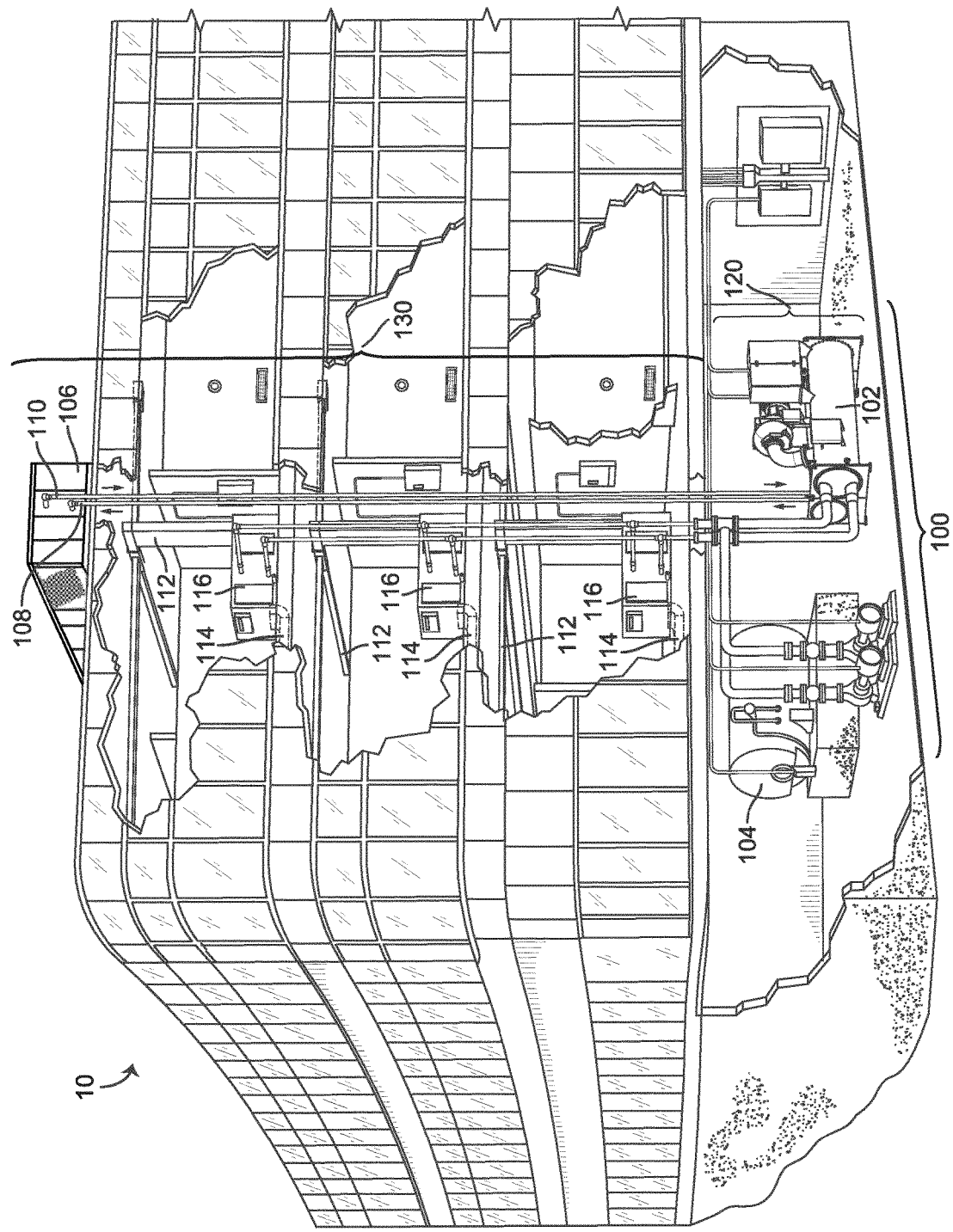
FIG. 1 is a drawing of a building equipped with a heating, ventilation, or air conditioning (HVAC) system, according to an exemplary embodiment.
Figure 2:
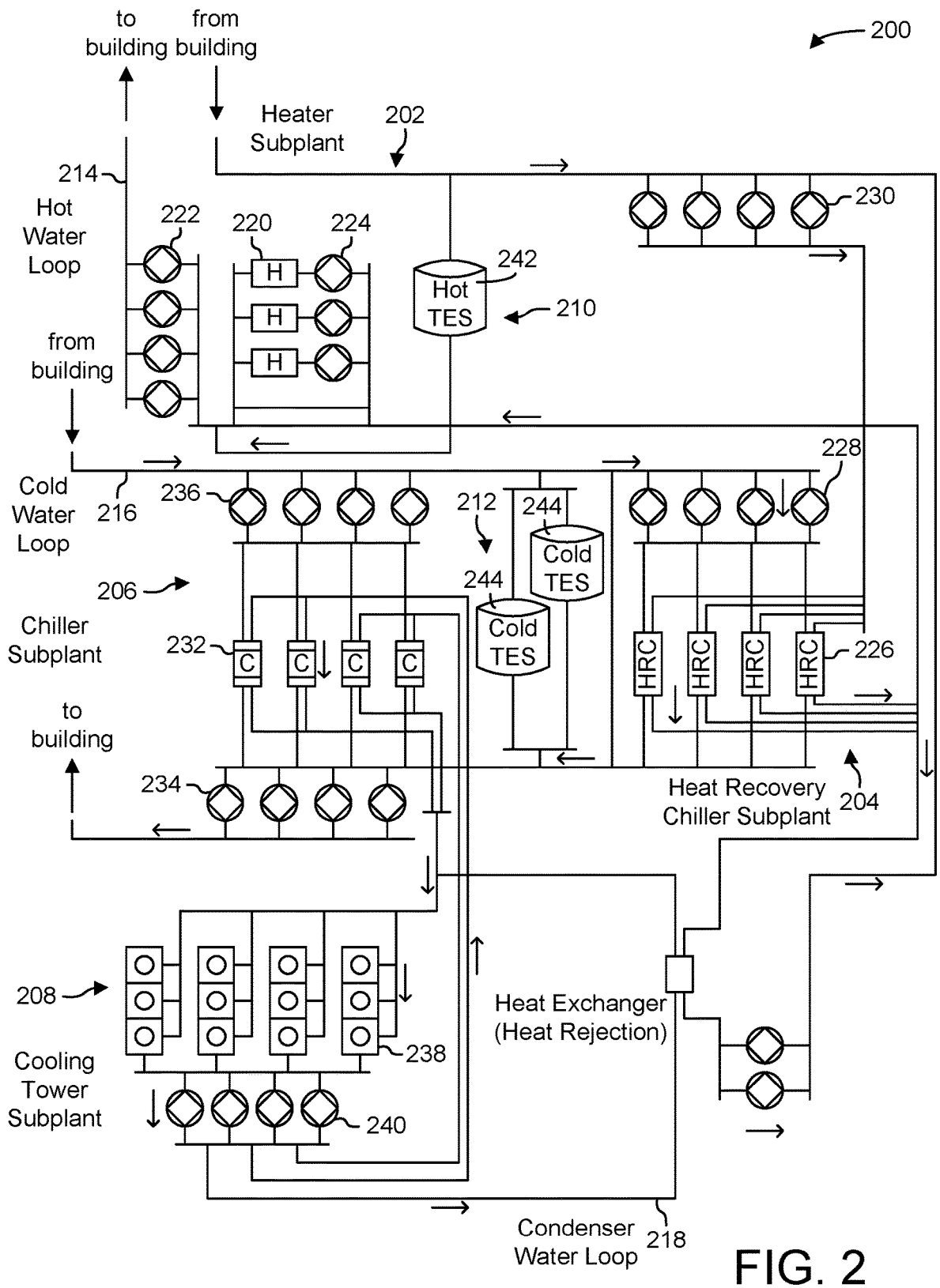
FIG. 2 is a drawing of a waterside system which can be used in combination with the HVAC system of FIG. 1, according to an exemplary embodiment.
Figure 3:
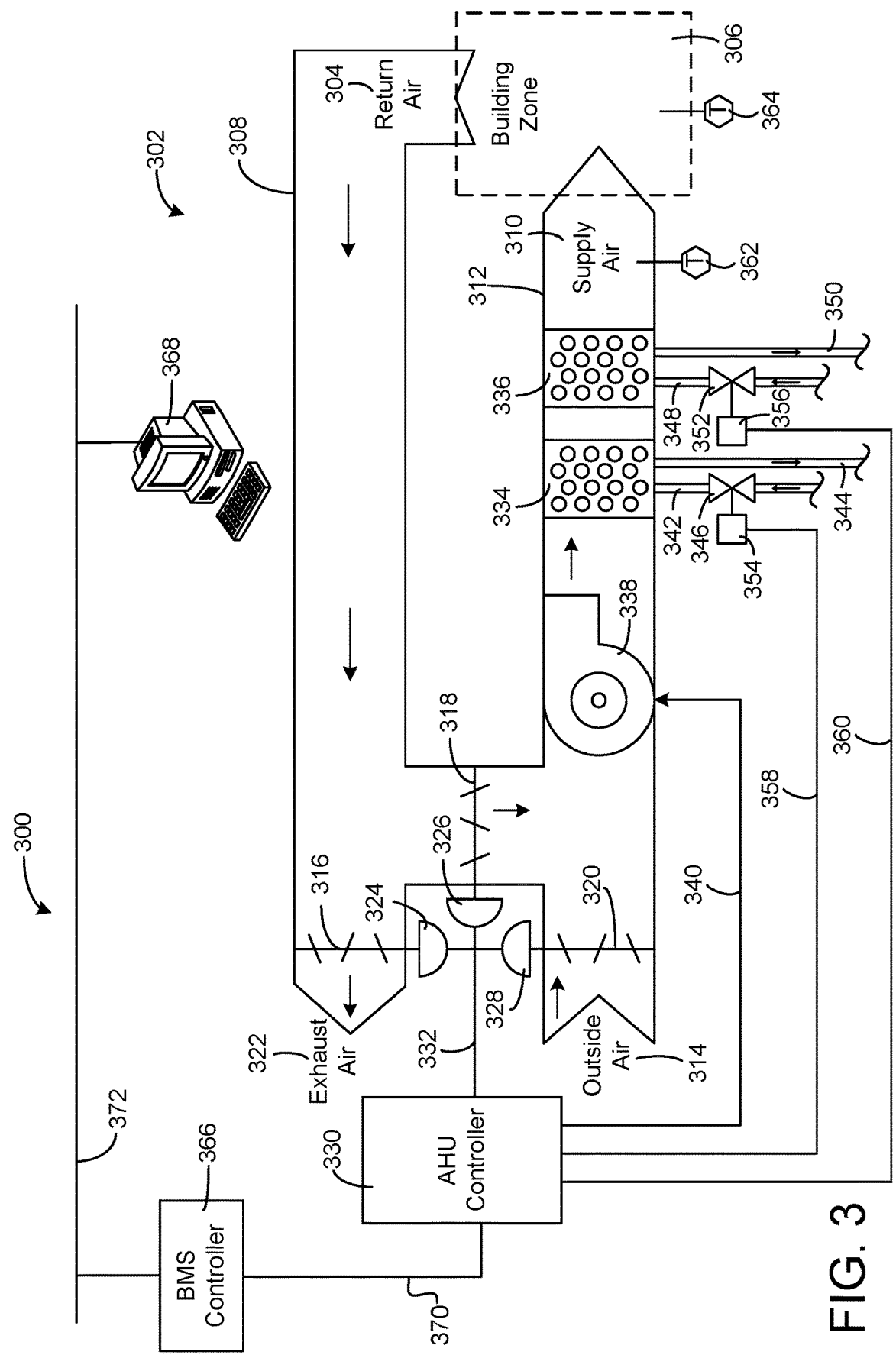
FIG. 3 is a drawing of an airside system which can be used in combination with the HVAC system of FIG. 1, according to an exemplary embodiment.
Figure 4:
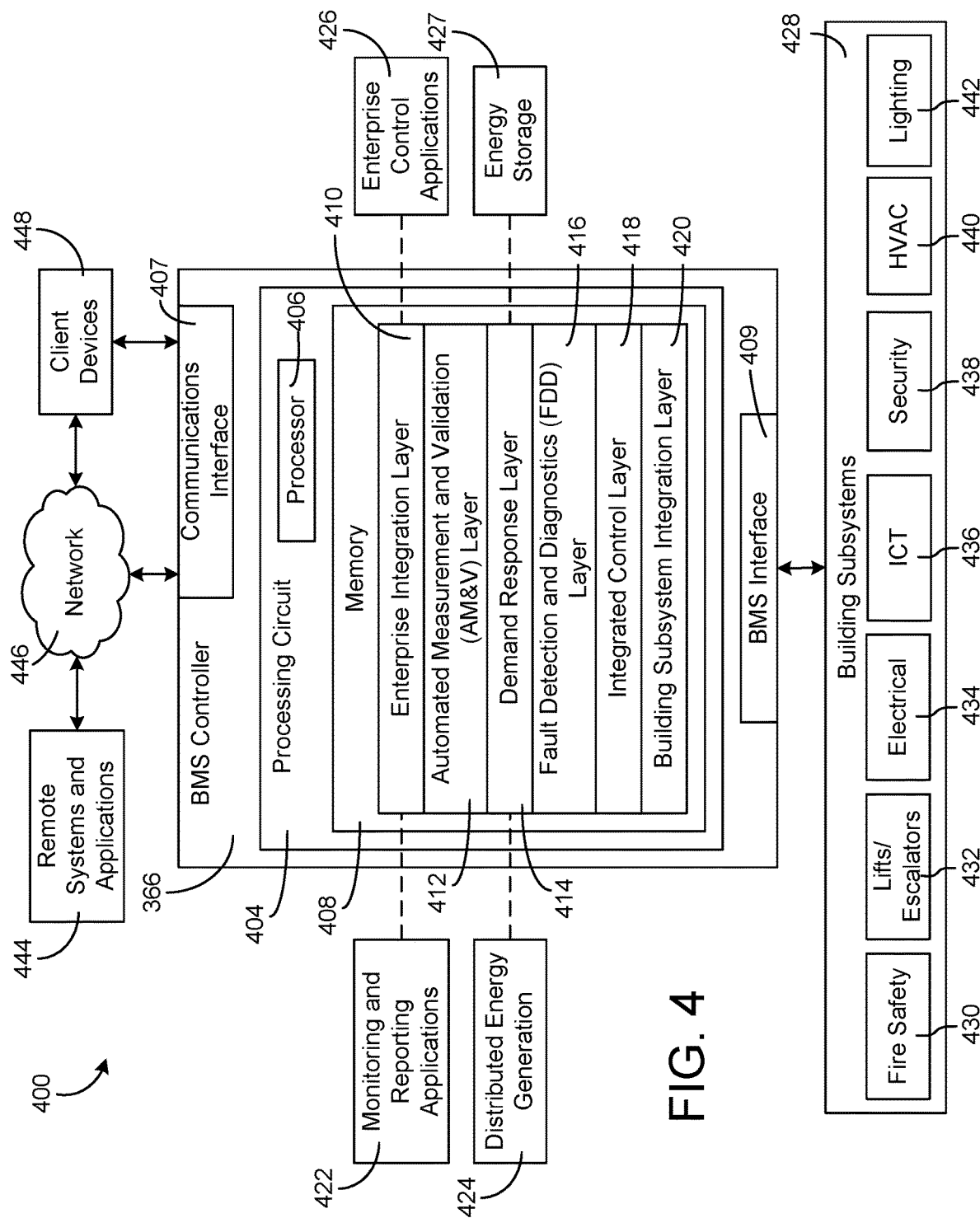
FIG. 4 is a block diagram of a building management system which can be used to monitor and control the building and HVAC system of FIG. 1, according to an exemplary embodiment.
Figure 5:
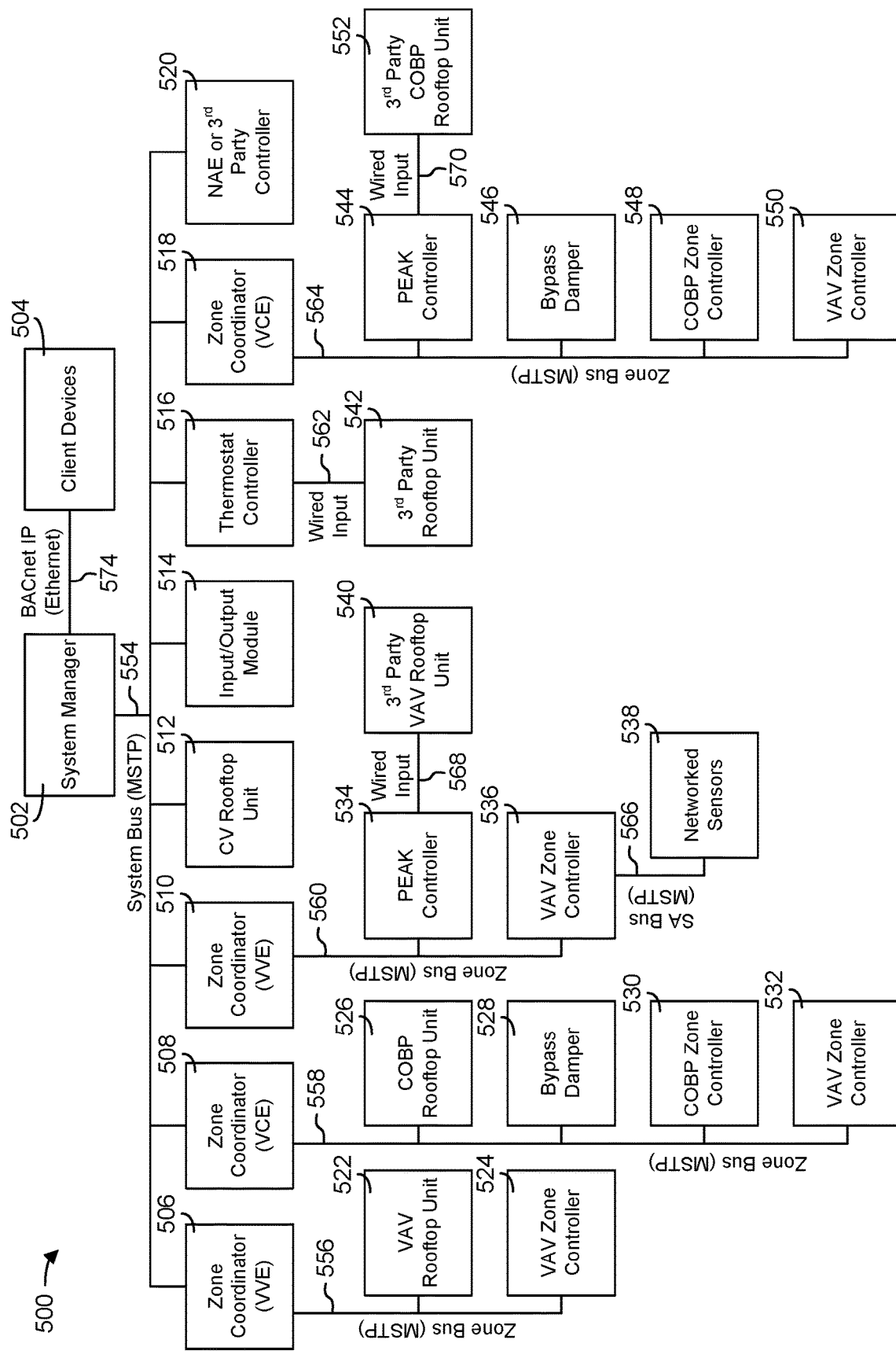
FIG. 5 is a block diagram of another building management system which can be used to monitor and control the building and HVAC system of FIG. 1, according to an exemplary embodiment.

A night versus day process can capture changes in a ratio between the night time and day time consumption or demand and can include a more robust methods of determining abnormal usage and an adaptive tuning mechanism.
Building HVAC Systems and Building Management Systems Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.
Building and HVAC System Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control processes in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Further implementations of a building management system 500 with energy analytics are described in U.S. patent application Ser. No. 15/408,405, entitled "Building Management System with Energy Analytics," filed Jan. 17, 2017, which claims the benefit of and priority to U.S. Provisional Pat. Appln. No. 62/286,273, filed Jan. 22, 2016, and is also a continuation-in-part of both U.S. patent application Ser. No. 15/182,579, filed Jun. 14, 2016, and U.S. patent application Ser. No. 15/182,580, filed Jun. 14, 2016, the entire disclosures of each of these patent applications are incorporated by reference herein.

Adaptive Tuning for Fault Detection

The BMS controller 366, a remote system or application 444, and/or a separate controller can be utilized for adaptive tuning for fault detection. The BMS controller 366, a remote system or application 444, and/or a separate controller can be configured to implement the processes described below. Utility consumption and demand during night time (unoccupied hours) compared to day time (occupied hours) vary, resulting in a static fault threshold either missing actual faults or generating false-positive results. Because of the varying utility demand, such as where commercial buildings turn off lighting and HVAC systems in the evening to conserve energy when there is little to no occupancy, customers who have the ability to monitor unusual changes in their load from day to day can advantageously use this varying information to determine inefficiencies or faults in their energy usage. These energy inefficiencies can lead to energy waste that causes the customer to pay more in utility bills due to increased consumption and demand. Moreover, such inefficiencies may be indicative of a faulty component operating at a higher load than expected, which could result in a failure when the building is unoccupied or minimally occupied.

Figure 6:
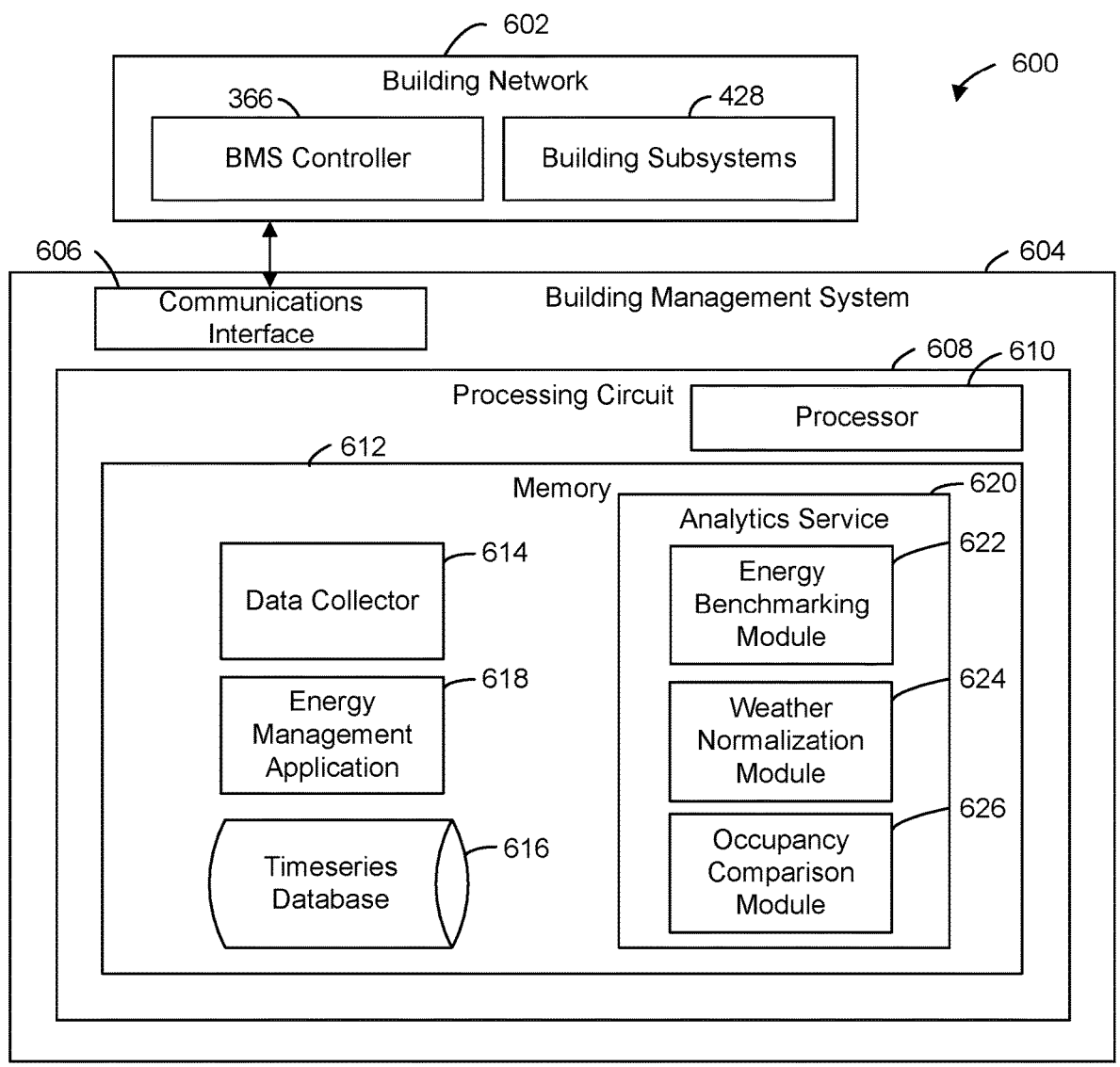
FIG. 6 is a system including a building management system in communication with a building network, according to an exemplary embodiment.

Referring now to FIG. 6, a system 600 including a building management system 604 in communication with a building network 602 is shown, according to an exemplary embodiment. Building network 502 can include BMS 400 (e.g., BMS controller 366, building subsystems 428, etc.) and/or any items (e.g., spaces, equipment, objects, points, etc.) of a building that building management system 604 can be associated with. Building management system 604 can be configured to provide various reporting capabilities regarding the items and/or facilitate providing commands (e.g., bulk commands, individual commands, etc.) to one or more of the entities (e.g., building equipment, control objects, control points, etc.) connected therewith.

Building management system 604 includes a communications interface 606 and a processing circuit 608 having a processor 610 and a memory 612. Processing circuit 608 can be communicably connected to communications interface 606 such that processing circuit 608 and the various components thereof can send and receive data via communications interface 606 (e.g., to/from building network 602, etc.). Processor 610 can be implemented as a general purpose processor, an application specific integrated circuit (ASIC), one or more field programmable gate arrays (FPGAs), a group of processing components, or other suitable electronic processing components.

Memory 612 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 612 can be or include volatile memory or non-volatile memory. Memory 612 can include database components, object code components, script components, or any other type of information structure for supporting the various activities and information structures described in the present application. According to an example embodiment, memory 612 is communicably connected to processor 610 via processing circuit 608 and includes computer code for executing (e.g., by processing circuit 608 and/or processor 610) one or more processes described herein. In some embodiments, building management system 604 is implemented within a single computer (e.g., one server, one housing, etc.). In various other embodiments, building management system 604 can be distributed across multiple servers or computers (e.g., that can exist in distributed locations).

Still referring to FIG. 6, memory 612 is shown to include a data collector 614, a timeseries database 616, an energy management application 618, and an analytics service 620. Components 614-620 can operate together to obtain timeseries data from building management system devices, such as devices of HVAC systems, airside system, waterside systems, etc.; store the data as a data timeseries; generate a result timeseries based on the data timeseries after performing an analysis on the data timeseries; and transmit the data timeseries and the results timeseries to BMS controller 366 or an external user device. Examples of timeseries data gathering and processing can be found in U.S. patent application Ser. No. 15/644,581 (now U.S. Pat. No. 10,169,486) filed Jul. 7, 2017, the entirety of which is incorporated by reference herein. Components 614-620 can be configured to receive inputs from and/or send outputs to building network 602 and other data sources and provide searching, reporting, and/or command capabilities.

Data collector 614 includes program instructions executed by one or more servers or processors (e.g., the processing circuit 608), in some embodiments. Data collector 614 is configured to collect data samples from one or more building management system devices of building network 602 and generate a data timeseries comprising the one or more data samples, in some embodiments. Data collector 614 can collect data samples from any time period and the time periods can have any length. The data timeseries can include a list of data samples in chronological order based on time stamps associated with each data sample. As data collector 614 collects the data samples for the data timeseries, data collector 614 can tag each data sample with a time stamp tag indicating when the data was collected, either by data collector 614 or by sensors at the one or more building management system devices. Data collector 614 can collect the data by polling building management system devices for the data. Data collector 614 can poll the building management system devices upon a request from an external user device (not shown) or at a pre-programmed rate indicating a time interval to collect the data. In some embodiments, data collector 614 can poll select building management system devices or each device of the building management system devices, depending on how data collector 614 is configured. After collecting data samples, data collector 614 can generate a data timeseries based on the time stamps for the data samples and store the generated data timeseries in timeseries database 616.

Timeseries database 616 includes program instructions executed by one or more servers or processors (e.g., the processing circuit 608), in some embodiments. Timeseries database 616 is configured to store the data timeseries collected and generated by data collector 614 from buildings and building management system devices, in some embodiments. Timeseries database 616 can be a graph database, MySQL, Oracle, Microsoft SQL, Postgre DB2, document store, search engine, key-value store, etc. Timeseries database 616 is configured to hold any amount of data samples, in some embodiments. Timeseries database 616 can be organized into sections. Each section can represent inputs received from a specific sensor or building management system device. For example, timeseries database 616 can include a timeseries including electrical usage data samples of different building management system devices. Timeseries database 616 can store the electrical usage data samples in a column with different data entries associated with times the temperature inputs were taken for each row. Each column in timeseries database 616 can represent a different sensor within the building management system devices while each row can represent different time stamps representing the time and date the data was received by data collector 614 or the time a sensor sensed the data. The sections can further be broken up into subsections directed to energy usage of specific areas and/or devices within a building or outside of a building or any other manner to break the data into subsections. Data received from building management system devices can be added or removed from time series database 616 at any time.

Analytics service 620 includes program instructions that are executed by one or more servers or processors (e.g., the processing circuit 608), in some embodiments. Analytics service 620 is configured to perform one or more analytics using the data timeseries collected by data collector 614 and generate a results timeseries comprising a plurality of result samples indicating results of the analytics, in some embodiments. An example of analytics that can be performed on a data timeseries is an analysis on how many days within a time period an energy usage metric exceeds an adaptively tunable threshold. The adaptively tunable threshold is a dynamic threshold that changes as data collector 614 collects more data and analytics are performed on the data to tune the adaptively tunable threshold. Calculations performed to determine the adaptively tunable threshold will be described in more detail below. Analytics service 620 can tag each day the energy usage metric exceeds the threshold with a corresponding fault tag. Analytics service 620 can be configured to perform any sort of analysis. In some embodiments, analytics service 620 adjusts a data timeseries being analyzed to account for different factors such as, but not limited to, the effects of weather, occupancy of a building, number of building management system devices supplying data samples, etc. After obtaining analytics of a data timeseries, analytics service 620 is configured to generate a results timeseries based on the analytics and store the results timeseries in timeseries database 616, in some embodiments.

Analytics service 620 includes an energy benchmarking module 622, a weather normalization module 624, and an occupancy comparison module 626, in some embodiments. In some embodiments, instead of or in addition to storing data timeseries in timeseries database 616, analytics service 620 is integrated with BMS controller 366 and is configured to send the data timeseries and/or result timeseries to BMS controller 366. Analytics service 620 can send both a data timeseries and an associated results timeseries to BMS controller 366 upon request or automatically after generating the results timeseries.

Energy benchmarking module 622 includes program instructions that are executed by one or more servers or processors (e.g., the processing circuit 608), in some embodiments. Energy benchmarking module 622 is configured to use a data timeseries collected by data collector 614 to calculate an energy usage metric for a building associated with the data timeseries, in some embodiments. The energy usage metric can include an energy usage intensity (EUI) and/or an energy density. The energy usage metric can include any energy usage related metric. In some embodiments, a data timeseries being analyzed by energy benchmarking module 622 is a resource consumption timeseries and the data samples of the data timeseries include electric consumption values, water consumption values, and/or gas consumption values. Energy benchmarking module 622 can aggregate the data samples into a results timeseries to determine how much energy a building used within a time period. Energy benchmarking module 622 is configured to generate the results timeseries for any time period, in some embodiments. Each time period can be selected by a user at a user device or automatically determined by BMS controller 366, in some embodiments.

Weather normalization module 624 includes program instructions that can be executed by one or more servers or processors (e.g., processing circuit 608). Weather normalization module 624 is configured to assist in generating a results timeseries by removing an effect of weather from a data timeseries, in some embodiments. Weather normalization module 624 is configured to analyze data of a data timeseries after receiving data samples related to the weather from an external device indicating the weather at times associated with each data sample in the data timeseries, in some embodiments. Using the weather data, weather normalization module 624 can remove data samples with time stamps at times when the weather was likely impacting operations of different building management system devices of a building. For example, if the temperature outside became unexpectedly cold in the middle of the summer and the HVAC devices of a building had to use more energy than anticipated because of the cold, weather normalization module 624 is configured to identify data from the days that it was uncharacteristically cold and remove the identified data so no analytics are performed on the identified data, in some embodiments.

Advantageously, by removing data samples from the data timeseries that includes data from building management system devices that are operating in uncharacteristic weather, weather normalization module 624 can account for the weather when determining how efficient building management system devices in a building are. If the data samples arising from the weather are included in a data timeseries when analytics service 620 is analyzing the data, any results timeseries generated from the data timeseries could be affected by unusual weather and not be a reliable indicator of how efficient any building management system devices of a building or the building as a whole is.

Occupancy comparison module 626 includes program instructions that are executed by one or more servers or processors (e.g., the processing circuit 608), in some embodiments. Occupancy comparison module 626 is configured to perform analytics on a data time series by using different analytic process, in some embodiments. Occupancy comparison module 626 can be configured to perform the steps of processes 800 and 900, shown and described with reference to FIGS. 8 and 9 below. For a brief overview of the steps of processes 800 and 900, occupancy comparison module 626 can use samples of data timeseries collected by data collector 614 to calculate an average of a minimum half of sorted energy consumption values for a first time period, use the samples of the data timeseries to calculate an average of a maximum half of sorted energy consumption values for a second time period, calculate a ratio of the average of the minimum half of sorted energy consumption values for the first time period to the average of the maximum half of sorted energy consumption values for the second time period, compare the calculated ratio to an adaptively tunable threshold value, and activate a system responsive to the calculated ratio exceeding the adaptively tunable threshold value. In some embodiments, occupancy comparison module 626 is configured to calculate a mean of a set of calculated ratios for an interval, calculates a median absolute deviation of the calculated ratios for the interval, and calculates the adaptively tunable threshold value based on the mean and the median absolute deviation.

Energy management application 618 includes program instructions to be executed by one or more servers or processors (e.g., processing circuit 608), in some embodiments. Energy management application 618 is configured to retrieve a data timeseries and an associated results timeseries from data timeseries database 616 in response to a request for timeseries data associated with one or more variables, in some embodiments. In some embodiments, the one or more variables relate to energy usage. Energy management application 618 can be configured to receive the request for a data timeseries and/or a results timeseries calculated by analytics service 620 from BMS controller 366 or from an external user device. Energy management application can transmit a requested data timeseries and/or results timeseries to BMS controller 366 or an external user device after retrieving the data timeseries and/or the results timeseries from timeseries database 616. Energy management application 618 can retrieve a data timeseries and/or results timeseries associated with any time period requested by BMS controller 366 and/or an external user device.

Figure 7:
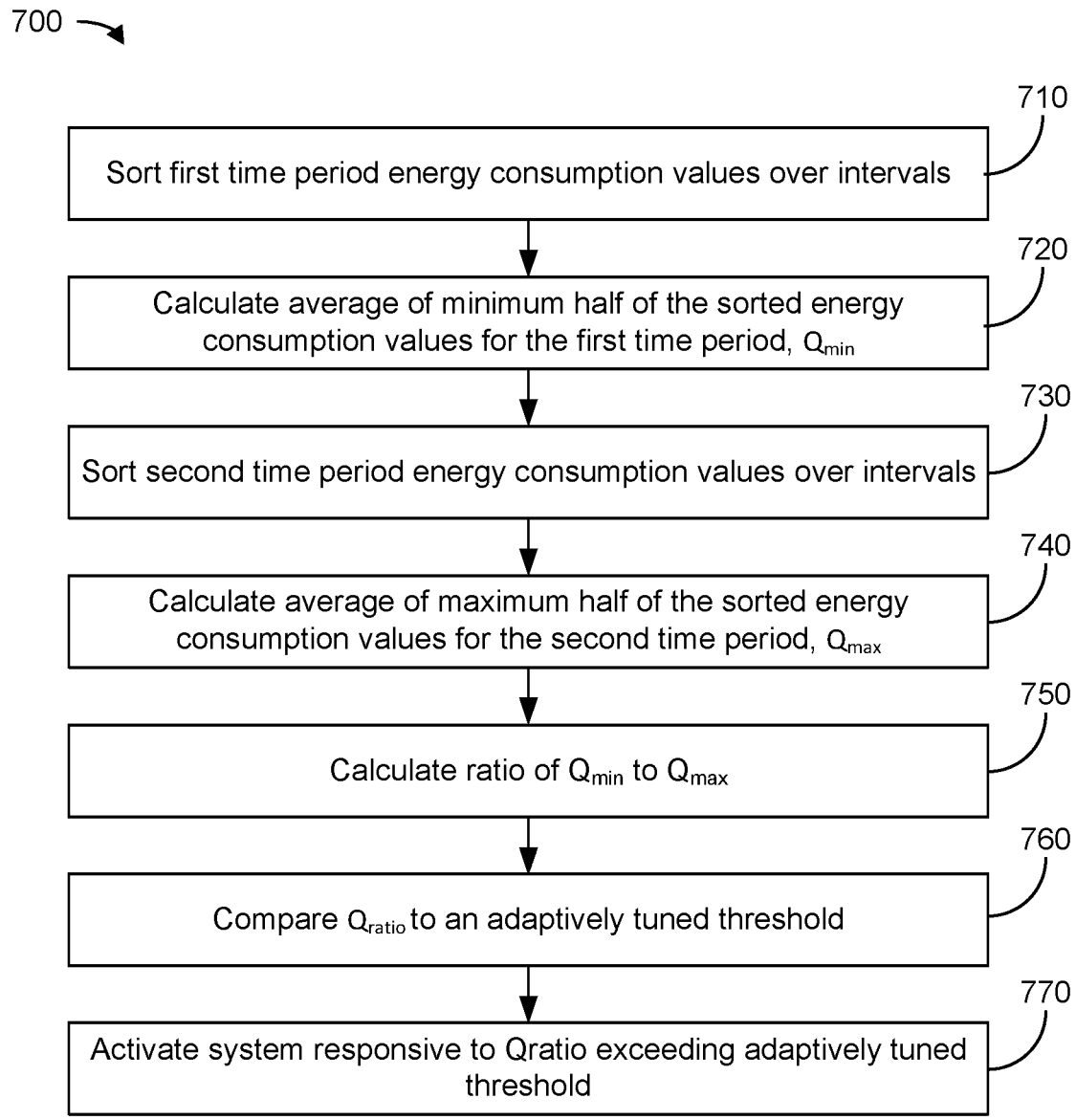
FIG. 7 is a process diagram for detecting outlier energy consumption for a building during a weekday that can be performed by the system of FIG. 6, according to an exemplary embodiment.

FIG. 7 depicts an implementation of a process 700 conducted by BMS controller 366 for detecting outlier energy consumption for a building during a weekday. The process 700 includes sorting a first time period of energy consumption values over intervals (block 710). The first time period can be a non-occupancy or night time period (e.g., 6 PM to 6 AM, 5 PM to 8 AM, etc.). In some implementations, the energy consumption values can be metered data values, such as an amount of electricity, a volume of water, a volume of natural gas, a volume of a combustible material, or other energy consumption values. The intervals can be hour intervals, thirty minute intervals, fifteen minute intervals, ten minute intervals, five minute intervals, etc. The sorting can be from highest to lowest or lowest to highest.

The process 700 includes calculating an average of the minimum half of the sorted energy consumption values for the first time period as $Q_{min}$ (block 720). For an example twelve hour period (6 PM to 6 AM) separated into fifteen minute intervals, there would be a total of 48 energy consumption values sorted. Thus, the minimum half would be the 24 lowest values of the 48 total energy consumption values. Calculating the average of those 24 energy consumption values results in the average, $Q_{min}$.

The process 700 further includes sorting a second time period of energy consumption values over intervals (block 730). The second time period can be an occupancy or day time period (e.g., 6 AM to 6 PM, 8 AM to 5 PM, etc.). In some implementations, the energy consumption values can be metered data values, such as an amount of electricity, a volume of water, a volume of natural gas, a volume of a combustible material, or other energy consumption values. The intervals can be hour intervals, thirty minute intervals, fifteen minute intervals, ten minute intervals, five minute intervals, etc. The sorting can be from highest to lowest or lowest to highest.

The process 700 includes calculating an average of the maximum half of the sorted energy consumption values for the second time period as $Q_{max}$ (block 640). For an example twelve hour period (6 AM to 6 PM) separated into fifteen minute intervals, there would be a total of 48 energy consumption values sorted. Thus, the maximum half would be the 24 highest values of the 48 total energy consumption values. Calculating the average of those 24 energy consumption values results in the average, $Q_{max}$.

Using half of the points in a respective occupied or unoccupied time period results in a more robust determination of outlier points. A single or several spike values (i.e., a high value during an unoccupied period or a low value during an occupied period) due to communication errors, data acquisition errors, or temporary changes in occupancy (i.e., during a fire drill) will not skew calculations for finding outliers, also known as masking. However, if an average of all the data in the occupied or unoccupied periods is used, then one or two large outliers may result in masking of the underlying data.

The process 700 further includes calculating a ratio of the night time, $Q_{min}$, to day time, $Q_{max}$, values (block 750). The ratio, $Q_{ratio}$, can be calculated as:

$$Q_{ratio} = \frac{Q_{min}}{Q_{max}}$$

For an example day time with an average consumption, $Q_{max}$, of 10,000 kWh and a night time with an average consumption, $Q_{min}$, of 9,000 kWh, the ratio, $Q_{ratio}$, is calculated as 0.9, meaning the night time consumption is approximately 90% of the day time consumption.

The process 700 further includes comparing the ratio, $Q_{ratio}$, to an adaptively tuned threshold (block 760). For an example adaptively tuned threshold, T=0.8, the $Q_{ratio}$ is compared to the threshold and a flag is triggered indicating that the date had a high nightly load if $Q_{ratio} \geq T$. In the example above of a $Q_{ratio}$ of 0.9, the flag can be triggered. The triggering of the flag may result in logging of the consumption values and/or time stamps and/or the particular date or may activate another system responsive to the $Q_{ratio}$ exceeding the adaptively tuned threshold value (block 770). The other system may include an alert system, an alarm system, and/or a control system. In some implementations, the control system can control one or more parameters for controlling components of the HVAC system 100 of FIG. 1, one or more building subsystems 428 of FIG. 4, and/or one or more components of the BMS 500 of FIG. 5. For instance, the activation of the other system (block 770) can deactivate or reduce a load of a lighting system 442 or HVAC system 440 for a subsequent night time cycle.

In some situations, data may be missing from one or more intervals. In such a situation, the data gap can be filled in two different ways depending on the condition. For data gaps that are only a single interval value (e.g., if the interval is a 15 minute interval and the data gap is 22 minutes or less in duration), then the missing value is replaced with the prior time sequence recorded value. If the gap is longer than a single interval (e.g., if the interval is a 15 minute interval and the data gap is than 22 minutes), then the missing values are replaced using values from another time period having a same characteristics, such as during the same time period from the prior week, prior month, prior day, prior year, etc. If these values are not available, then data from a further prior week is used. If the data from the further prior week is not available, then a linear interpolation of the current data values can be used to fill the data gap or the data is left unfilled.

Figure 8:
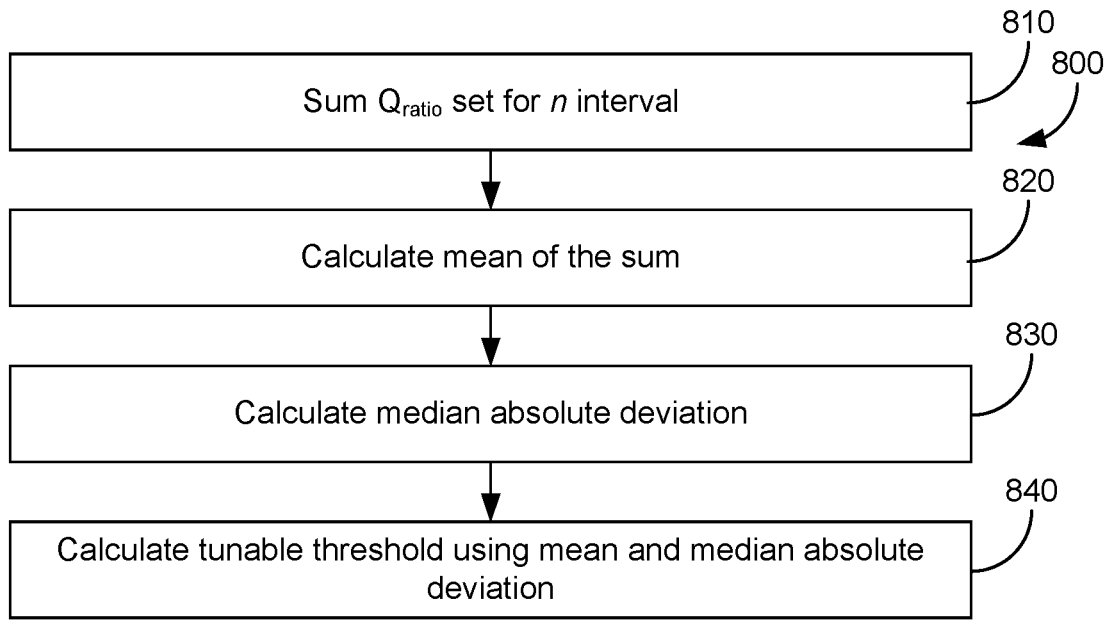
FIG. 8 is a process diagram for adaptively tuning a fault threshold that can be performed by the system of FIG. 6, according to an exemplary embodiment.

FIG. 8 depicts a process 800 conducted by BMS controller 366 for adaptively tuning the threshold for process 700. Using a set threshold yields a constant level for detecting changes in $Q_{ratio}$. However, a constant bound may not be desired once deployed. Having a constant bound or threshold does not adapt to changes in customer behavior and/or seasonality. Accordingly, an adaptive tuning for the threshold is provided by process 800. The process 800 includes summing a set of $Q_{ratio}$ values for an n interval set (block 810). Then interval set can be a seven day (e.g., weekly) interval, a thirty day and/or monthly interval, a quarterly interval, a seasonal interval, or any other interval set. That is, given $Q_{ratio}(i)$ is the ith value in vector $Q_{ratio}$ such that:

$$Q_{ratio} = \{Q_{ratio}(1), Q_{ratio}(2), Q_{ratio}(3), \ldots Q_{ratio}(m)\}.$$

The process 800 includes calculating a mean of the sum of set of $Q_{ratio}$ values for the n interval set (block 820). The mean value of the last n interval of $Q_{ratio}$ values is defined as:

$$Q_m = \frac{\sum_{i=j-n+1}^{j} Q_{ratio}(i)}{n}$$

where j is the current time sample, and n is the total interval. For a monthly interval, the n interval can be 30 by default.

The process 800 includes calculating a median absolute deviation of the set of $Q_{ratio}$ values for the n interval set (block 830). The median absolute deviation of the last n days of $Q_{ratio}$ values is calculated by:

$$Q_{MAD} = \text{median}\{|Q_{ratio} - \tilde{Q}|\}$$

where $\tilde{Q}$ is the median of the $Q_{ratio}$.

The process 800 further includes calculating a tunable threshold using the mean and median absolute deviation values (block 840). The threshold $Q_T$, is calculated based on:

$$Q_T = Q_m + X \cdot Q_{MAD}$$

where x is a scaling factor, such as 3, that can be adjusted manually based on $Q_m$. The tunable threshold value may then be updated at predetermined intervals, such as based on an interval set of a seven day (e.g., weekly) interval, a thirty day and/or monthly interval, a quarterly interval, a seasonal interval, or any other interval set.

Figure 9:
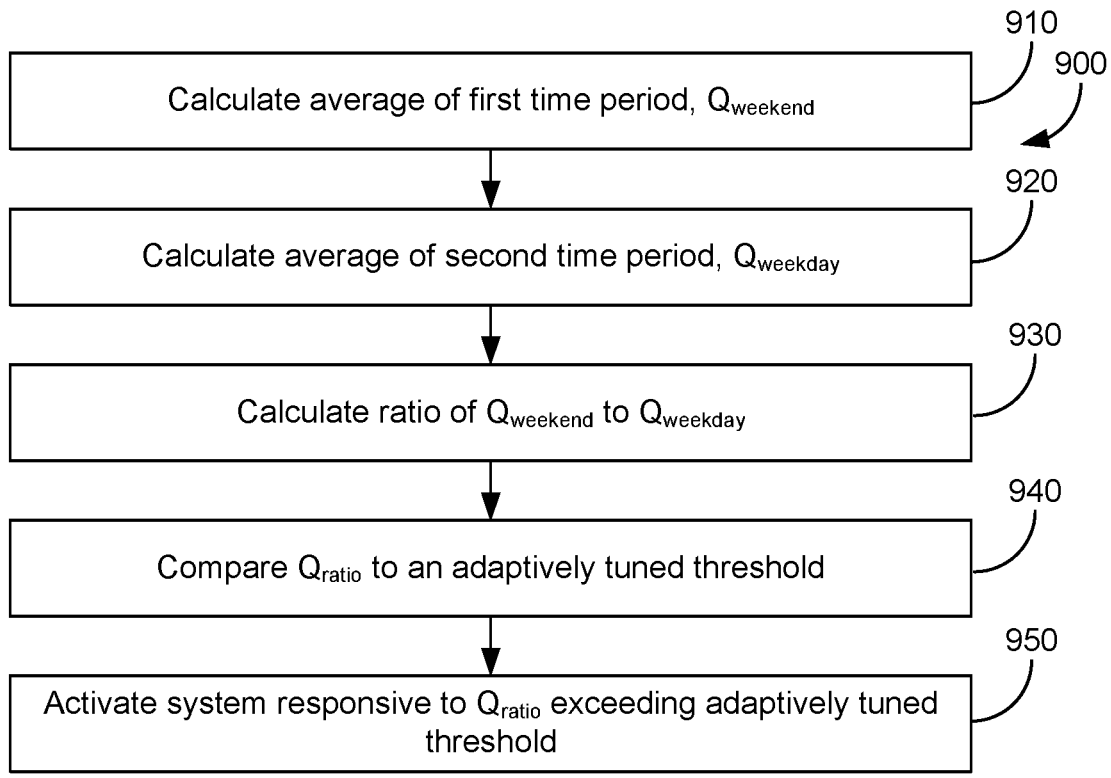
FIG. 9 is a process diagram for detecting outlier energy consumption for a building during a weekend that can be performed by the system of FIG. 6, according to an exemplary embodiment.

FIG. 9 depicts a further process 900 conducted by BMS controller 366 for detecting outlier energy consumption for a building during a weekend. The process 900 includes calculating an average of energy consumption values for a first time period as $Q_{weekend}$ (block 910). For an example twenty four hour period separated into fifteen minute intervals over the weekend days of Saturday and Sunday, there would be a total of 192 energy consumption values that are averaged.

The process 900 further includes calculating an average of energy consumption values for a second time period as $Q_{weekday}$ (block 920). For an example twenty four hour period separated into fifteen minute intervals over the weekdays of Monday through Friday, there would be a total of 480 energy consumption values that are averaged.

The process 900 further includes calculating a ratio of the weekend, $Q_{weekend}$, to weekday, $Q_{weekday}$, values (block 930). The ratio, $Q_{ratio}$, can be calculated as:

$$Q_{ratio} = \frac{Q_{weekend}}{Q_{weekday}}$$

For an example weekday time set with an average consumption, $Q_{weekday}$, of 5,000 kWh and a weekend time set with an average consumption, $Q_{weekend}$, of 4,000 kWh, the ratio, $Q_{ratio}$, is calculated as 0.8, meaning the weekend consumption is approximately 80% of the weekday consumption.

The process 900 further includes comparing the ratio, $Q_{ratio}$, to an adaptively tuned threshold (block 940). For an example adaptively tuned threshold, T=0.5, the $Q_{ratio}$ is compared to the threshold and a flag is triggered indicating that the date had a weekend load if $Q_{ratio} \geq T$. In the example above of a $Q_{ratio}$ of 0.8, the flag can be triggered. The triggering of the flag may result in logging of the consumption values and/or time stamps and/or the particular date periods or may activate another system responsive to the $Q_{ratio}$ exceeding the adaptively tuned threshold value (block 940). The other system may include an alert system, an alarm system, and/or a control system. In some implementations, the control system can control one or more parameters for controlling components of the HVAC system 100 of FIG. 1, one or more building subsystems 428 of FIG. 4, and/or one or more components of the BMS 500 of FIG. 5. For instance, the activation of the other system (block 950) can deactivate or reduce a load of a lighting system 442 or HVAC system 440 for a subsequent weekend cycle.

In some situations, data may be missing from one or more intervals. In such a situation, the data gap can be filled in two different ways depending on the condition. For data gaps that are only a single interval value (e.g., if the interval is a 15 minute interval and the data gap is 22 minutes or less in duration), then the missing value is replaced with the prior time sequence recorded value. If the gap is longer than a single interval (e.g., if the interval is a 15 minute interval and the data gap is than 22 minutes), then the missing values are replaced using values during the same time period from the prior week. If these values are not available, then data from a further prior week is used. If the data the further prior week is not available, then a linear interpolation of the current data values can be used to fill the data gap or the data is left unfilled.

Referring now to FIG. 10 is a night versus day results table 1000, according to an exemplary embodiment. Table 1000 illustrates energy usage data collected from different buildings (indicated as different customers) and the number of days where faults were detected using the night versus day process, conducted by occupancy module 626, shown and described with reference to FIG. 6. In some embodiments, results table 1000 is generated by occupancy module 626 and presented to users via a user device. The data includes, in different columns, customer numbers 1004, a number of faults detected 1006, total days the data was collected 1008, true positives 1010, false positives 1012, false negatives 1014, true negatives 1016, precision 1018, recall 1020, and F1 1022, in some embodiments. Numbers in parenthesis show benchmark data indicating values that the actual data would reach if other systems and methods were used to calculate faults and energy usage. Graphs associated with the different buildings from which the data for the night versus day process results table was taken and analyzed is discussed below with reference to FIGS. 12-21.

Customer numbers 1004 is shown to be a list of buildings associated with a particular customer where the building management system 604 implements the night versus day process based on data of the building of the particular customer to identify faults. In some embodiments, the building management system 604 performs the night versus day process for one or multiple of the buildings in the table 1000. In some embodiments, each of the buildings is associated with a particular system similar to, or the same as, the building management system 604. Any type of building can be included in the list. Each customer represents a new row in portion 1000 that data is associated with. Number of faults detected 1006 can be the number of faults detected within a set time period for a customer. A fault can represent a day where a $Q_{ratio}$ exceeds an adaptively tuned threshold based on the night versus day process. In some embodiments, a fault is a day where energy usage exceeds a threshold for a time period within a single day.

Total days the data was collected 1008 can represent the number of days that data was collected for a customer. True positives 1010 can be a number of faults that were correctly detected, determined by a visual inspection of the data for each day. False positives 1012 can be a total number of faults that were detected when they should not have been detected. Similar to true positives 1010, false positives 1012 are determined based on a visual inspection. False negatives 1014 can be a number of days where faults were not detected when there was a fault. True negatives 1016 can be number of days where faults were correctly not detected. Each of precision 1018, recall 1020, and F1 1022 (e.g., an F-score) are calculations of accuracy indicating how accurate the night versus day process is performed based on the number of false positives, true positives, false negatives, and true negatives for each customer of table 1000. Table 1000 includes a mean of accuracy calculations precision 1018, recall 1020, and F1 1022. The mean is obtained based on results from each customer in table 1000.

Referring now to FIG. 11 is a weekend versus weekday process results table 1100, according to an exemplary embodiment. Table 1100 illustrates energy usage data collected from different buildings and the number of days where faults were detected using the night versus day process. The data includes, in different columns, customer numbers 1104, a number of faults detected 1106, total days the data was collected 1108, true positives 1110, false positives 1112, false negatives 1114, true negatives 1116, precision 1118, recall 1120, and F1 1122, in some embodiments. Numbers in parenthesis show benchmark data indicating values that the actual data would reach if other systems and methods were used to calculate faults and energy usage. Graphs associated with different buildings from which the data for weekend versus weekday process results table 110 was taken and analyzed is discussed below with reference to FIGS. 22-31. Table 1100 includes a mean of accuracy calculations precision 1118, recall 1120, and F1 1122. The mean is obtained based on results from each customer in table 1100.

Figure 12:
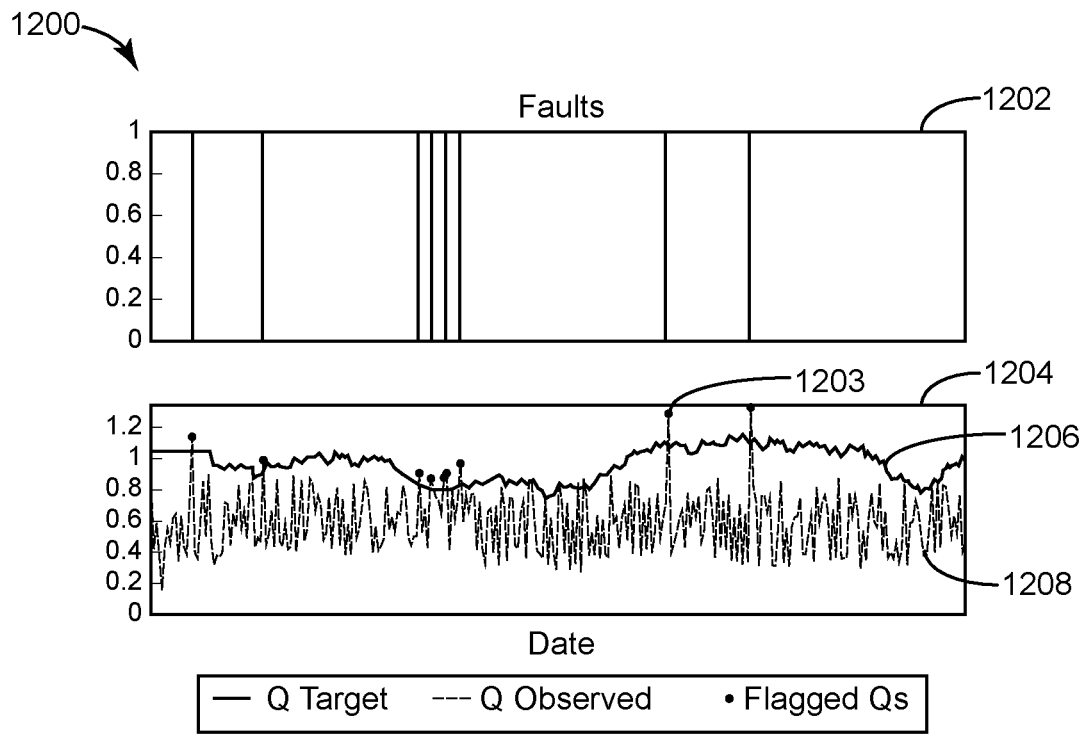
FIG. 12 is two graphs of data illustrating a Q ratio over time calculated by a night versus day process and indicating days that the Q ratio exceeds an adaptive threshold for a first customer, according to an exemplary embodiment.

Referring now to FIG. 12, graphs of data 1200 illustrating a Q ratio 1208 over time calculated by a night versus day process and indicating days that Q ratio 1208 exceeds an adaptive threshold trend 1206 for customer 1 is shown, according to an exemplary embodiment. Q ratio 1208 can be generated by occupancy comparison module 626. Graphs of data 1200 includes two graphs, a fault graph 1202 and a Q ratio graph 1204, each graph 1202 and 1204 showing data related to energy usage of building management system devices calculated for customer 1. Q ratio graph 1204 includes Q ratio trend 1208 of the energy usage calculated by controller 366 and/or energy management application 618 daily. Q ratio graph 1204 also includes adaptive threshold trend 1206 that is shown to change over time. Every day that calculated Q ratio trend 1208 exceeds adaptive threshold 1206, a circle corresponding to the day appears at the data sample and a line appears on fault graph 1202 (e.g., as indicated by marker 1203). If Q ratio 1208 does not exceed the adaptive threshold, however, no corresponding fault indicator appears in fault graph 1202 and Q ratio trend 1208.

Figure 13:
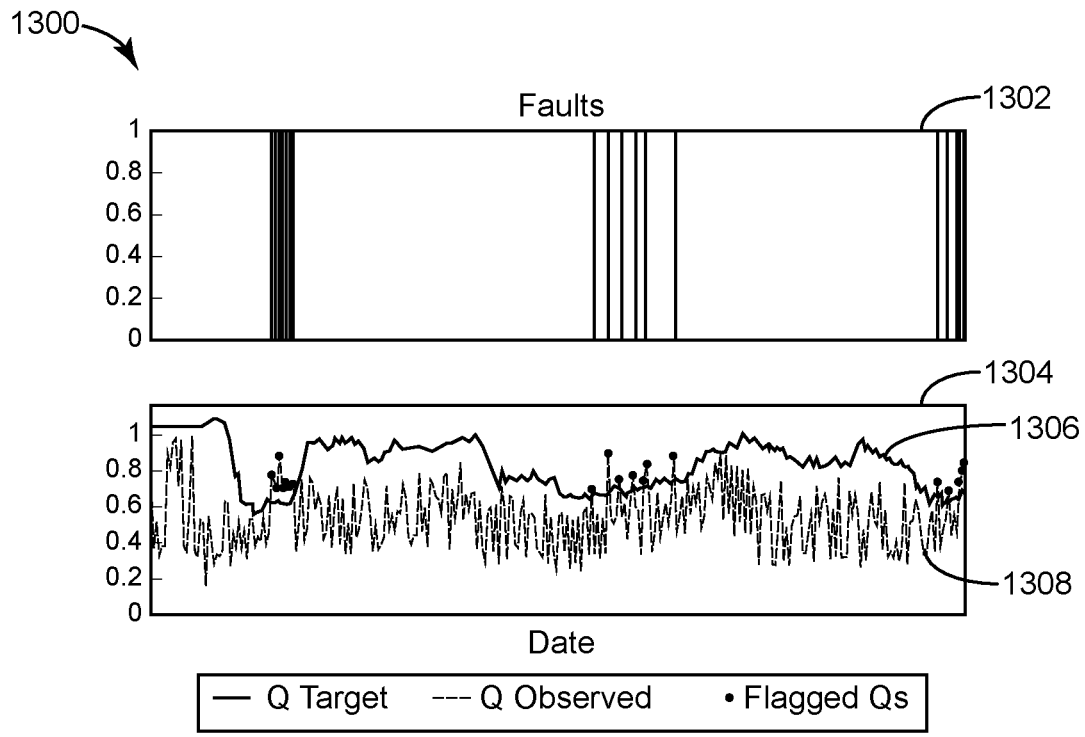
FIG. 13 is two graphs of data illustrating a Q ratio over time calculated by the night versus day process and indicating days that the Q ratio exceeds an adaptive threshold for a second customer, according to an exemplary embodiment.

Referring now to FIG. 13, graphs of data 1300 illustrating a Q ratio trend 1308 over time calculated by a night versus day process and indicating days that Q ratio trend 1308 exceeds an adaptive threshold trend 1306 for customer 2 is shown, according to an exemplary embodiment. Q ratio trend 1308 can be generated by occupancy comparison module 626. Similar to graphs of data 1200, graphs of data 1300 is shown to include a fault graph 1302 and a Q ratio graph 1304. Each graph 1302 and 1304 illustrates calculated faults over time in a manner similar to fault graph 1202 and Q ratio graph 1204, shown and discussed with reference to FIG. 12.

Figure 14:
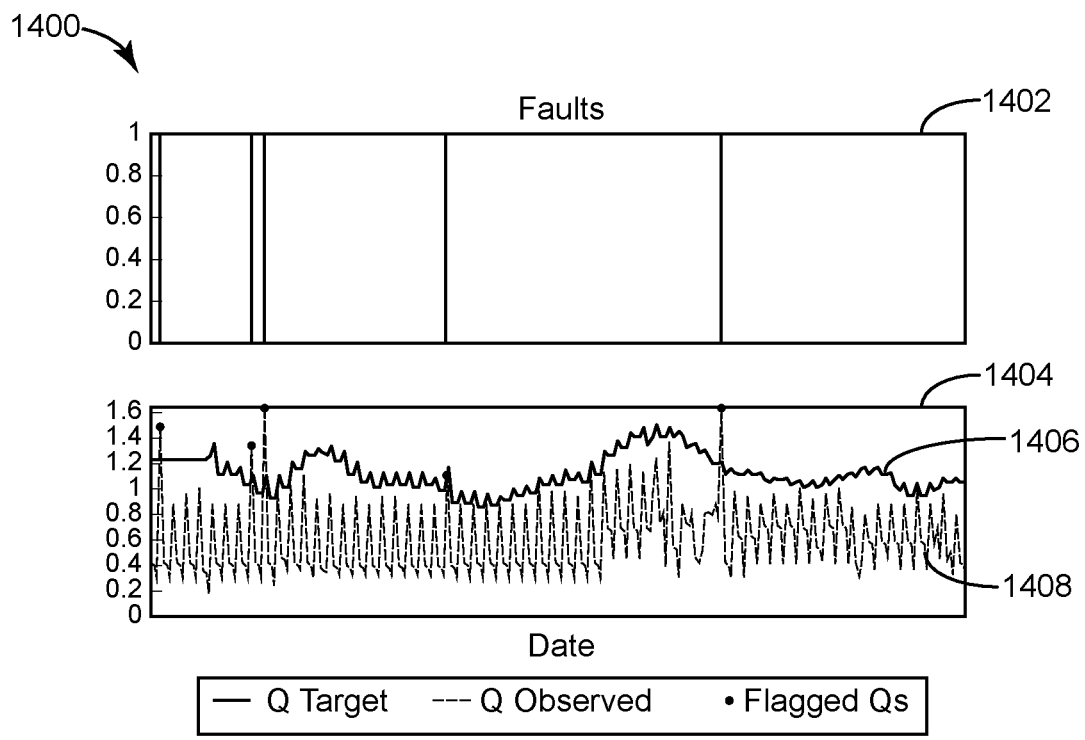
FIG. 14 is two graphs of data illustrating a Q ratio over time calculated by the night versus day process and indicating days that the Q ratio exceeds an adaptive threshold for a third customer, according to an exemplary embodiment.

Referring now to FIG. 14, graphs of data 1400 illustrating a Q ratio trend 1408 over time calculated by a night versus day process and indicating days that Q ratio trend 1408 exceeds an adaptive threshold 1306 trend for customer 3 is shown, according to an exemplary embodiment. Q ratio trend 1408 can be generated by occupancy comparison module 626. Similar to graphs of data 1200, graphs of data 1400 is shown to include a fault graph 1402 and a Q ratio graph 1404. Each graph 1402 and 1404 illustrates calculated faults over time in a manner similar to fault graph 1202 and Q ratio graph 1204, shown and discussed with reference to FIG. 12.

Figure 15:
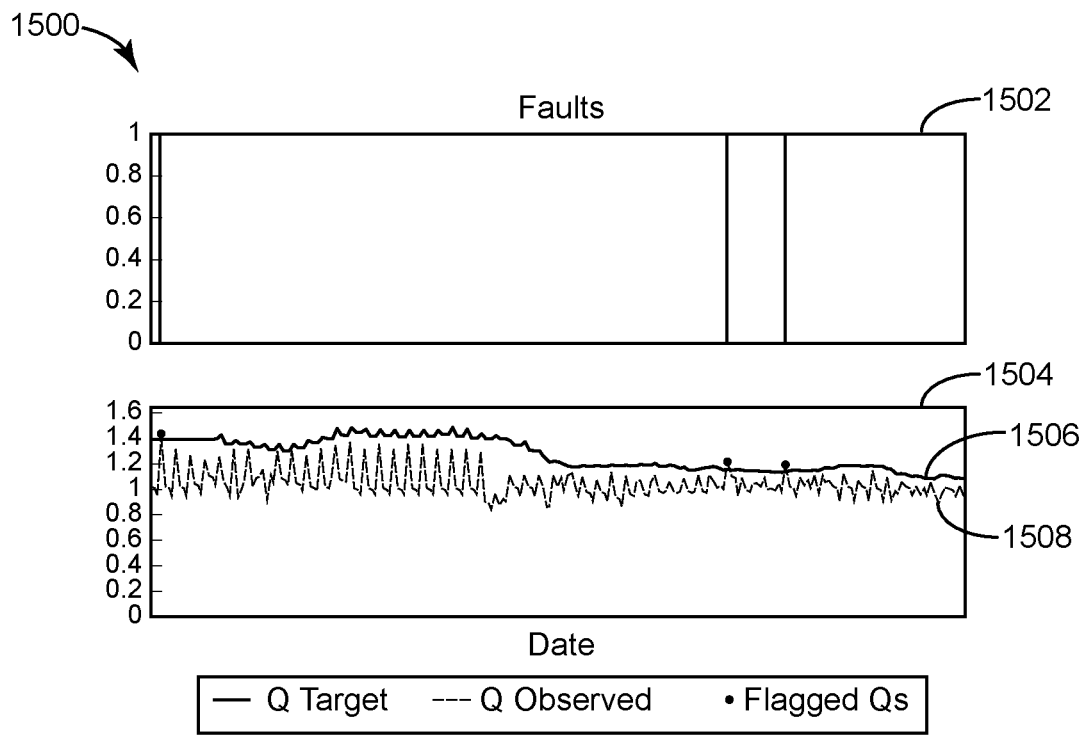
FIG. 15 is two graphs of data illustrating a Q ratio over time calculated by the night versus day process and indicating days that the Q ratio exceeds an adaptive threshold for a fourth customer, according to an exemplary embodiment.

Referring now to FIG. 15, graphs of data 1500 illustrating a Q ratio trend 1508 over time calculated by a night versus day process and indicating days that Q ratio trend 1508 exceeds an adaptive threshold trend 1306 for customer 4 is shown, according to an exemplary embodiment. Q ratio trend 1508 can be generated by occupancy comparison module 626. Similar to graphs of data 1200, graphs of data 1500 is shown to include a fault graph 1502 and a Q ratio graph 1504. Each graph 1502 and 1504 illustrates calculated faults over time in a manner similar to fault graph 1202 and Q ratio graph 1204, shown and discussed with reference to FIG. 12.

Figure 16:
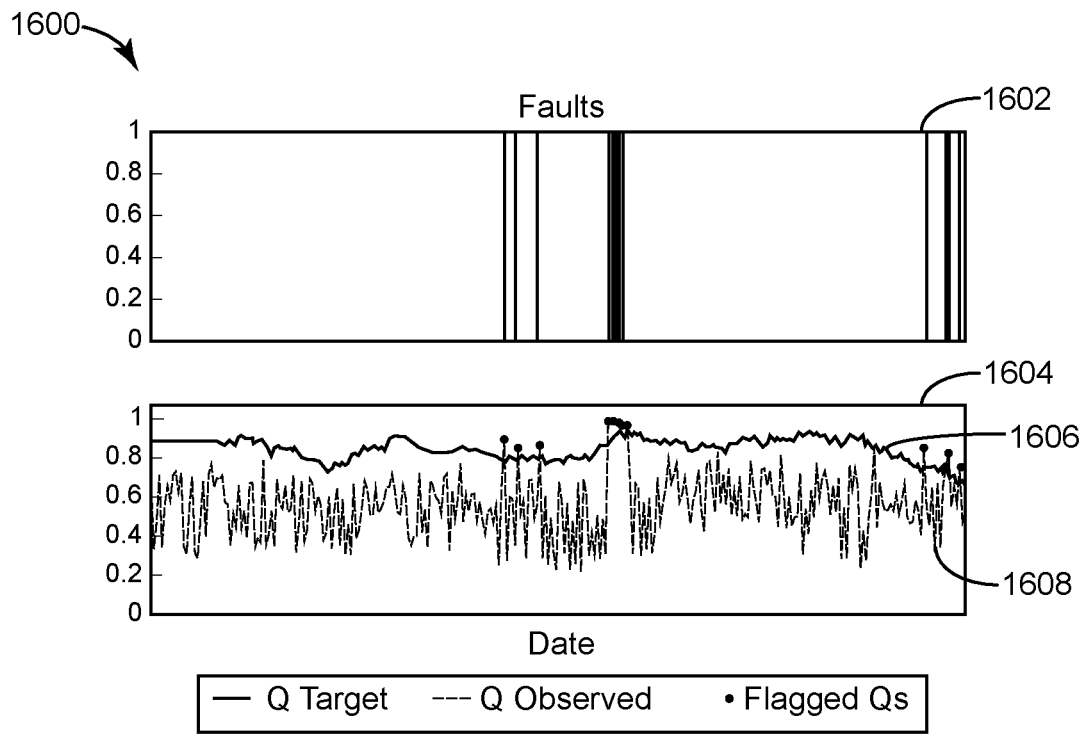
FIG. 16 is two graphs of data illustrating a Q ratio over time calculated by the night versus day process and indicating days that the Q ratio exceeds an adaptive threshold for a fifth customer, according to an exemplary embodiment.

Referring now to FIG. 16, graphs of data 1600 illustrating a Q ratio trend 1608 over time calculated by a night versus day process and indicating days that Q ratio trend 1608 exceeds an adaptive threshold trend 1606 for customer 5 is shown, according to an exemplary embodiment. Q ratio trend 1608 can be generated by occupancy comparison module 626. Similar to graphs of data 1200, graphs of data 1600 is shown to include a fault graph 1602 and a Q ratio graph 1604. Each graph 1602 and 1604 illustrates calculated faults over time in a manner similar to fault graph 1202 and Q ratio graph 1204, shown and discussed with reference to FIG. 12.

Figure 17:
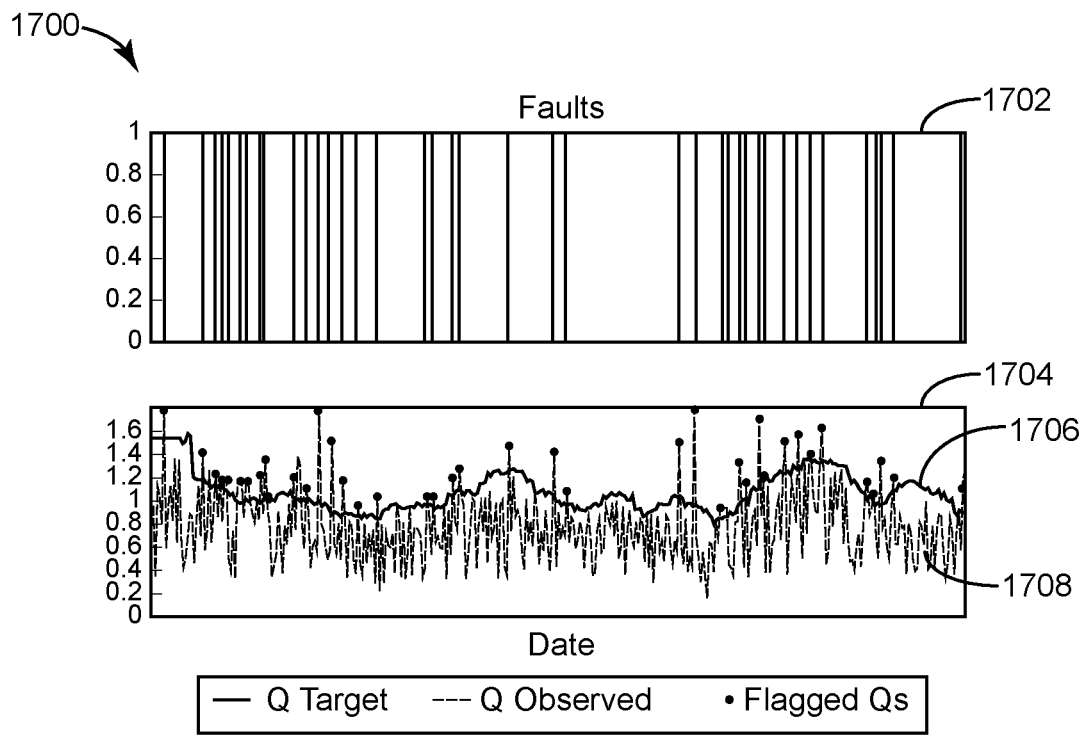
FIG. 17 is two graphs of data illustrating a Q ratio over time calculated by the night versus day process and indicating days that the Q ratio exceeds an adaptive threshold for a sixth customer, according to an exemplary embodiment.

Referring now to FIG. 17, graphs of data 1700 illustrating a Q ratio trend 1708 over time calculated by a night versus day process and indicating days that Q ratio trend 1708 exceeds an adaptive threshold trend 1706 for customer 6 is shown, according to an exemplary embodiment. Q ratio trend 1708 can be generated by occupancy comparison module 626. Similar to graphs of data 1200, graphs of data 1700 is shown to include a fault graph 1702 and a Q ratio graph 1704. Each graph 1702 and 1704 illustrates calculated faults over time in a manner similar to fault graph 1202 and Q ratio graph 1204, shown and discussed with reference to FIG. 12.

Figure 18:
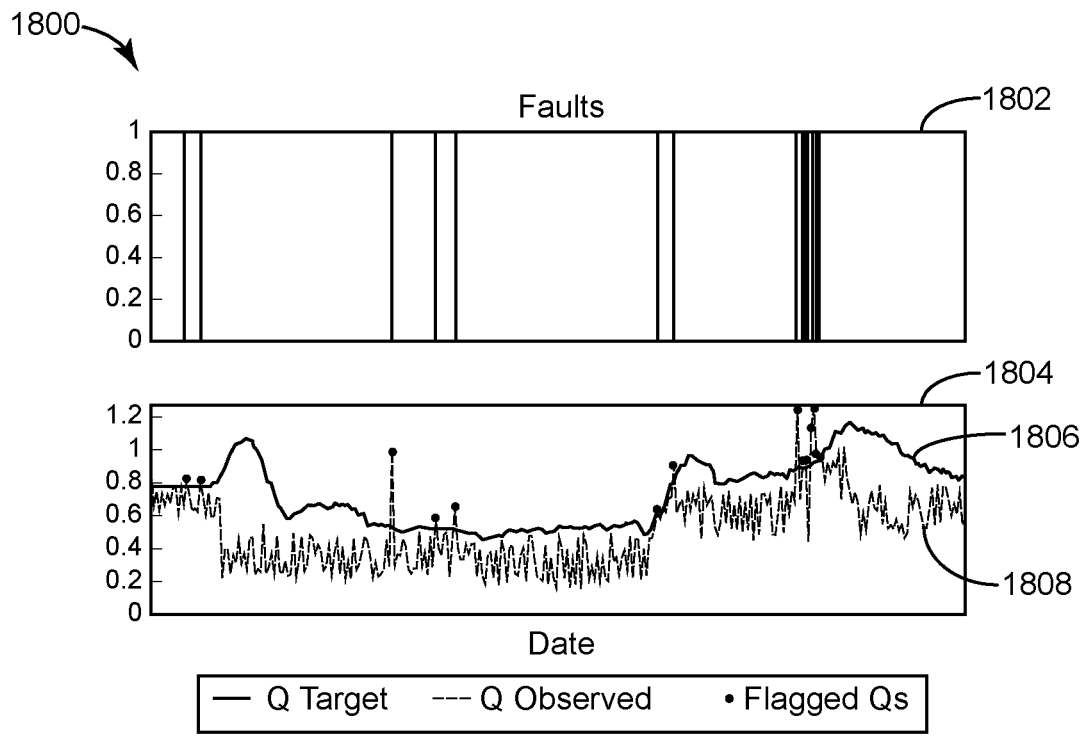
FIG. 18 is two graphs of data illustrating a Q ratio over time calculated by the night versus day process and indicating days that the Q ratio exceeds an adaptive threshold for a seventh customer, according to an exemplary embodiment.

Referring now to FIG. 18, graphs of data 1800 illustrating a Q ratio trend 1808 over time calculated by a night versus day process and indicating days that Q ratio trend 1808 exceeds an adaptive threshold trend 1806 for customer 7 is shown, according to an exemplary embodiment. Q ratio trend 1808 can be generated by occupancy comparison module 626. Similar to graphs of data 1200, graphs of data 1800 is shown to include a fault graph 1802 and a Q ratio graph 1804. Each graph 1802 and 1804 illustrates calculated faults over time in a manner similar to fault graph 1202 and Q ratio graph 1204, shown and discussed with reference to FIG. 12.

Figure 19:
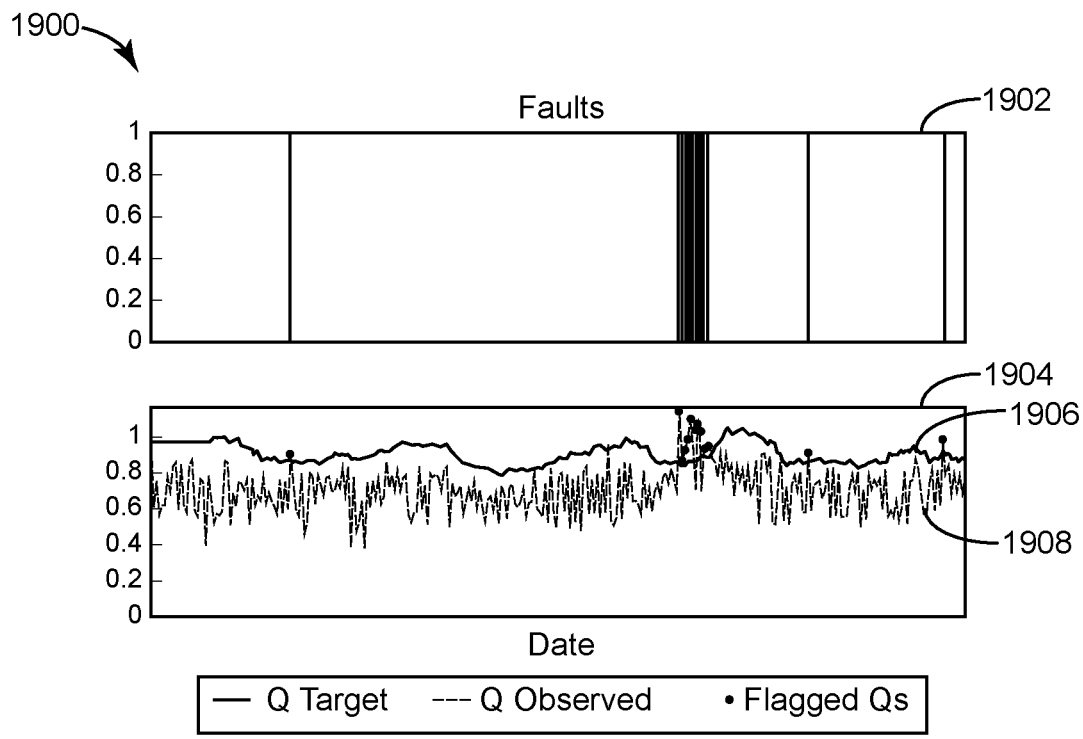
FIG. 19 is two graphs of data illustrating a Q ratio over time calculated by the night versus day process and indicating days that the Q ratio exceeds an adaptive threshold for an eighth customer, according to an exemplary embodiment.

Referring now to FIG. 19, graphs of data 1900 illustrating a Q ratio trend 1908 over time calculated by a night versus day process and indicating days that Q ratio trend 1908 exceeds an adaptive threshold trend 1906 for customer 8 is shown, according to an exemplary embodiment. Q ratio trend 1908 can be generated by occupancy comparison module 626. Similar to graphs of data 1200, graphs of data 1900 is shown to include a fault graph 1902 and a Q ratio graph 1904. Each graph 1902 and 1904 illustrates calculated faults over time in a manner similar to fault graph 1202 and Q ratio graph 1204, shown and discussed with reference to FIG. 12.

Figure 20:
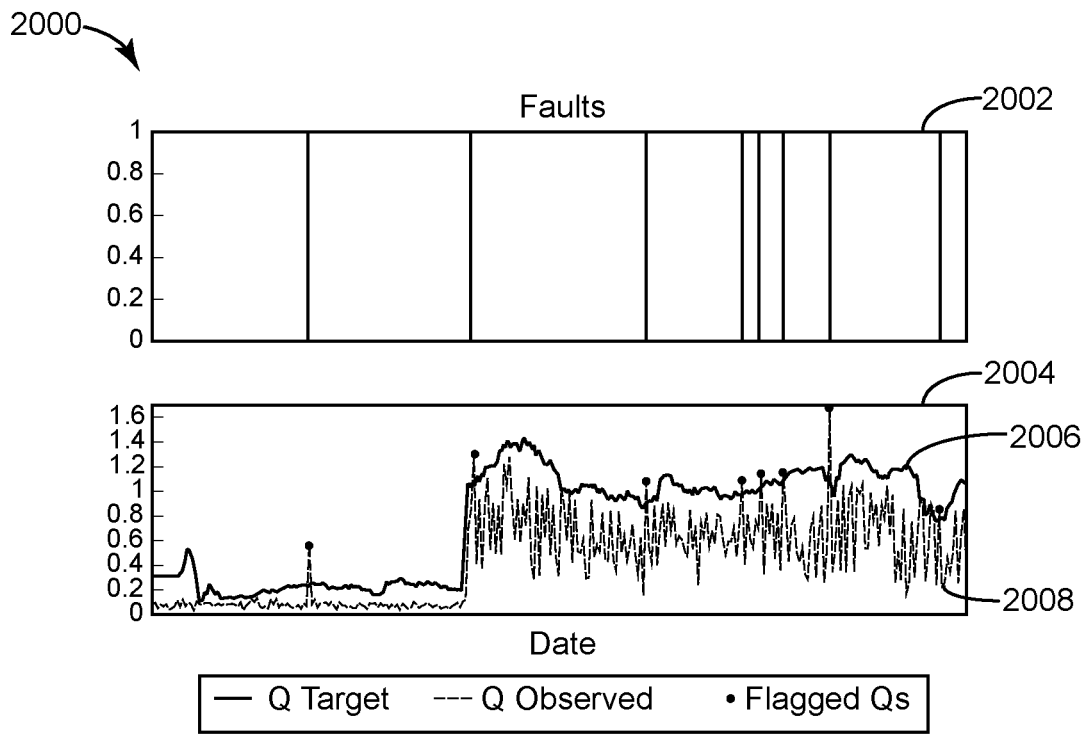
FIG. 20 is two graphs of data illustrating a Q ratio over time calculated by the night versus day process and indicating days that the Q ratio exceeds an adaptive threshold for a ninth customer, according to an exemplary embodiment.

Referring now to FIG. 20, graphs of data 2000 illustrating a Q ratio trend 2008 over time calculated by a night versus day process and indicating days that Q ratio trend 2008 exceeds an adaptive threshold trend 2006 for customer 9 is shown, according to an exemplary embodiment. Q ratio trend 2008 can be generated by occupancy comparison module 626. Similar to graphs of data 1200, graphs of data 2000 is shown to include a fault graph 2002 and a Q ratio graph 2004. Each graph 2002 and 2004 illustrates calculated faults over time in a manner similar to fault graph 1202 and Q ratio graph 1204, shown and discussed with reference to FIG. 12.

Figure 21:
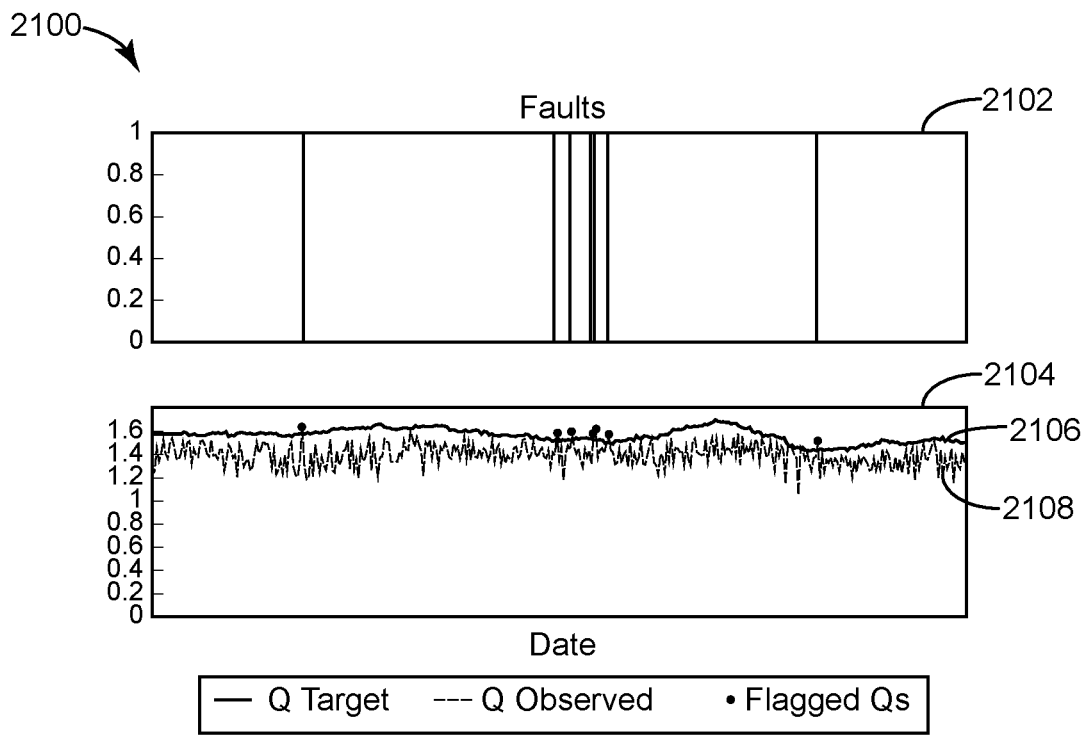
FIG. 21 is two graphs of data illustrating a Q ratio over time calculated by the night versus day process and indicating days that the Q ratio exceeds an adaptive threshold for a tenth customer, according to an exemplary embodiment.

Referring now to FIG. 21, graphs of data 2100 illustrating a Q ratio trend 2108 over time calculated by a night versus day process and indicating days that Q ratio trend 2108 exceeds an adaptive threshold trend 2106 for customer 10 is shown, according to an exemplary embodiment. Q ratio trend 2108 can be generated by occupancy comparison module 626. Similar to graphs of data 1200, graphs of data 2100 is shown to include a fault graph 2102 and a Q ratio graph 2104. Each graph 2102 and 2104 illustrates calculated faults over time in a manner similar to fault graph 1202 and Q ratio graph 1204, shown and discussed with reference to FIG. 12.

Figure 22:
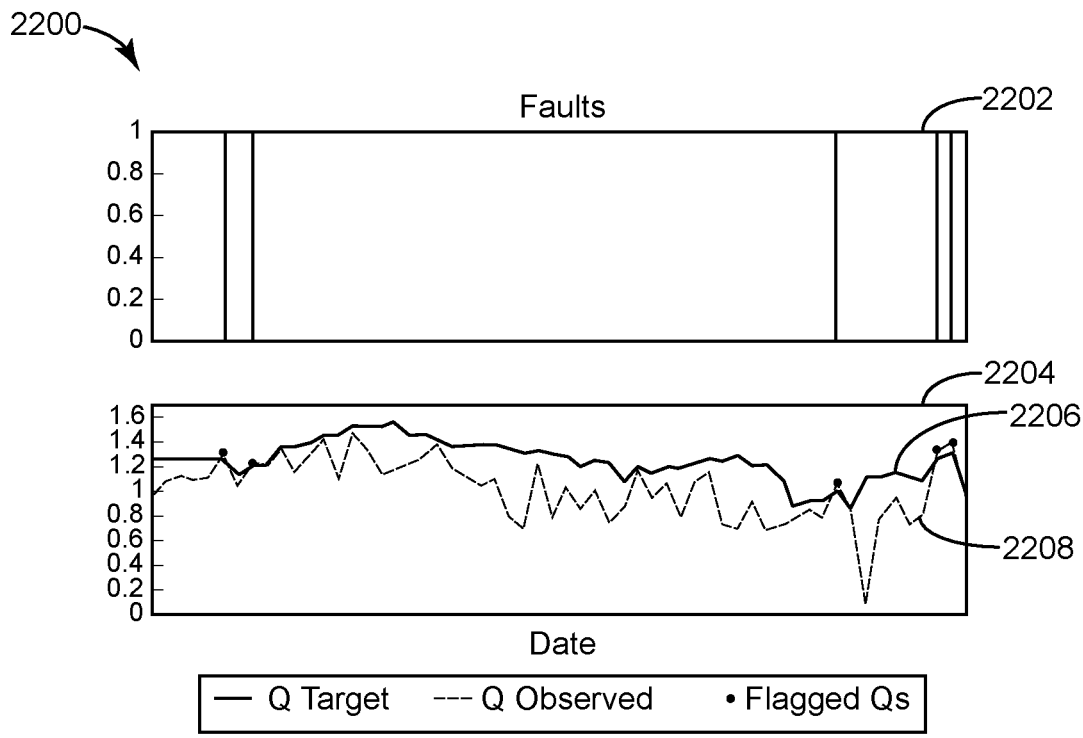
FIG. 22 is two graphs of data illustrating a Q ratio over time calculated by a weekend versus weekday process and indicating days that the Q ratio exceeds an adaptive threshold for the first, according to an exemplary embodiment.

Referring now to FIG. 22, graphs of data 2200 illustrating a Q ratio trend 2208 over time calculated by a weekend versus weekday process and indicating days that Q ratio trend 2208 exceeds an adaptive threshold trend 2206 for customer 1 is shown, according to an exemplary embodiment. Q ratio trend 2208 can be generated by occupancy comparison module 626. Similar to graphs of data 1200, graphs of data 2200 is shown to include a fault graph 2202 and a Q ratio graph 2204. Each graph 2202 and 2204 illustrates calculated faults over time in a manner similar to fault graph 1202 and Q ratio graph 1204, shown and discussed with reference to FIG. 12.

Figure 23:
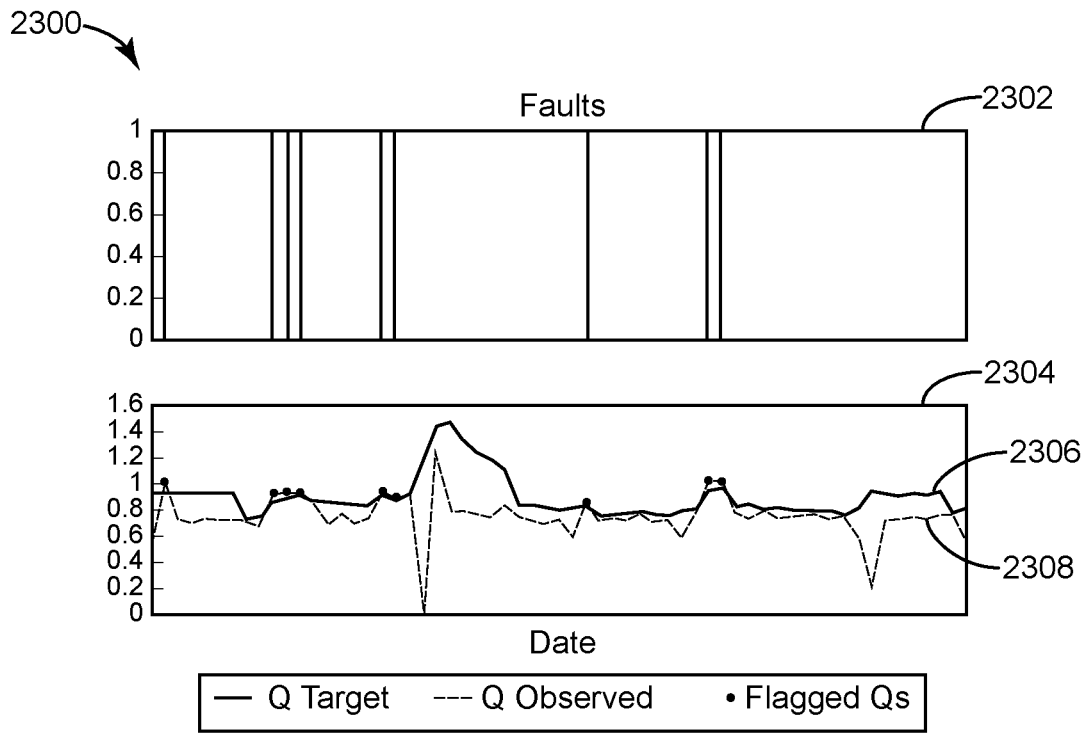
FIG. 23 is two graphs of data illustrating a Q ratio over time calculated by the weekend versus weekday process and indicating days that the Q ratio exceeds an adaptive threshold for the second customer, according to an exemplary embodiment.

Referring now to FIG. 23, graphs of data 2300 illustrating a Q ratio trend 2308 over time calculated by a weekend versus weekday process and indicating days that Q ratio trend 2308 exceeds an adaptive threshold trend 2306 for customer 2 is shown, according to an exemplary embodiment. Q ratio trend 2308 can be generated by occupancy comparison module 626. Similar to graphs of data 1200, graphs of data 2300 is shown to include a fault graph 2302 and a Q ratio graph 2304. Each graph 2302 and 2304 illustrates calculated faults over time in a manner similar to fault graph 1202 and Q ratio graph 1204, shown and discussed with reference to FIG. 12.

Figure 24:
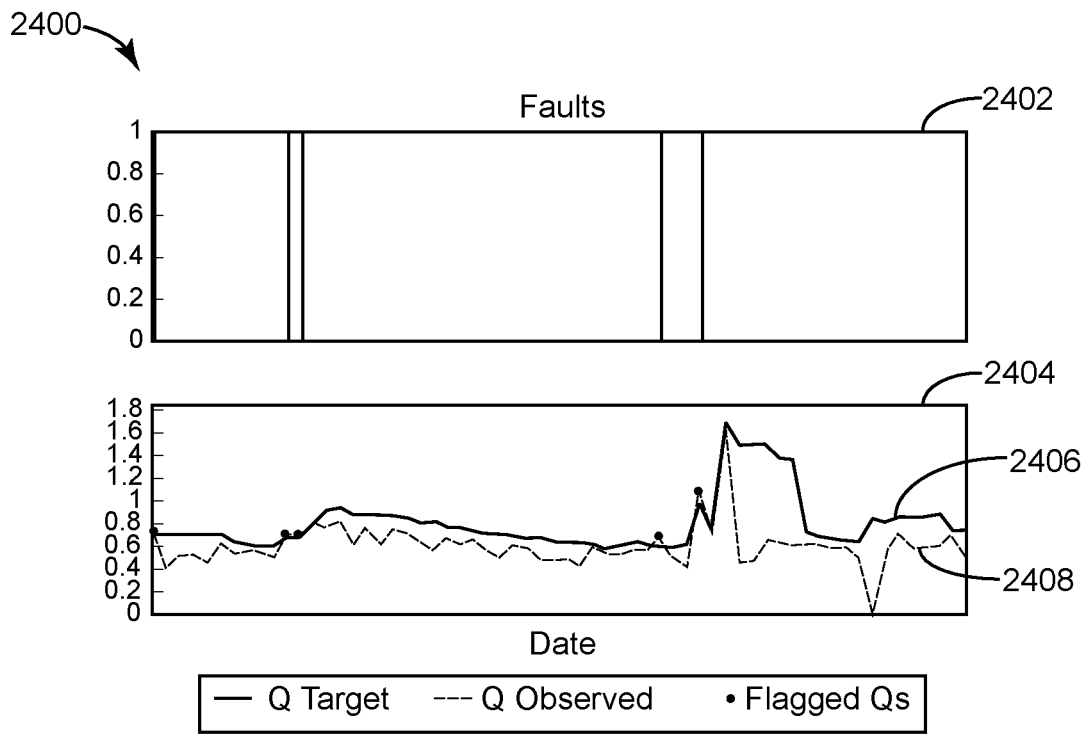
FIG. 24 is two graphs of data illustrating a Q ratio over time calculated by the weekend versus weekday process and indicating days that the Q ratio exceeds an adaptive threshold for the third customer, according to an exemplary embodiment.

Referring now to FIG. 24, graphs of data 2400 illustrating a Q ratio trend 2408 over time calculated by a weekend versus weekday process and indicating days that Q ratio trend 2408 exceeds an adaptive threshold trend 2406 for customer 3 is shown, according to an exemplary embodiment. Q ratio trend 2408 can be generated by occupancy comparison module 626. Similar to graphs of data 1200, graphs of data 2400 is shown to include a fault graph 2402 and a Q ratio graph 2404. Each graph 2402 and 2404 illustrates calculated faults over time in a manner similar to fault graph 1202 and Q ratio graph 1204, shown and discussed with reference to FIG. 12.

Figure 25:
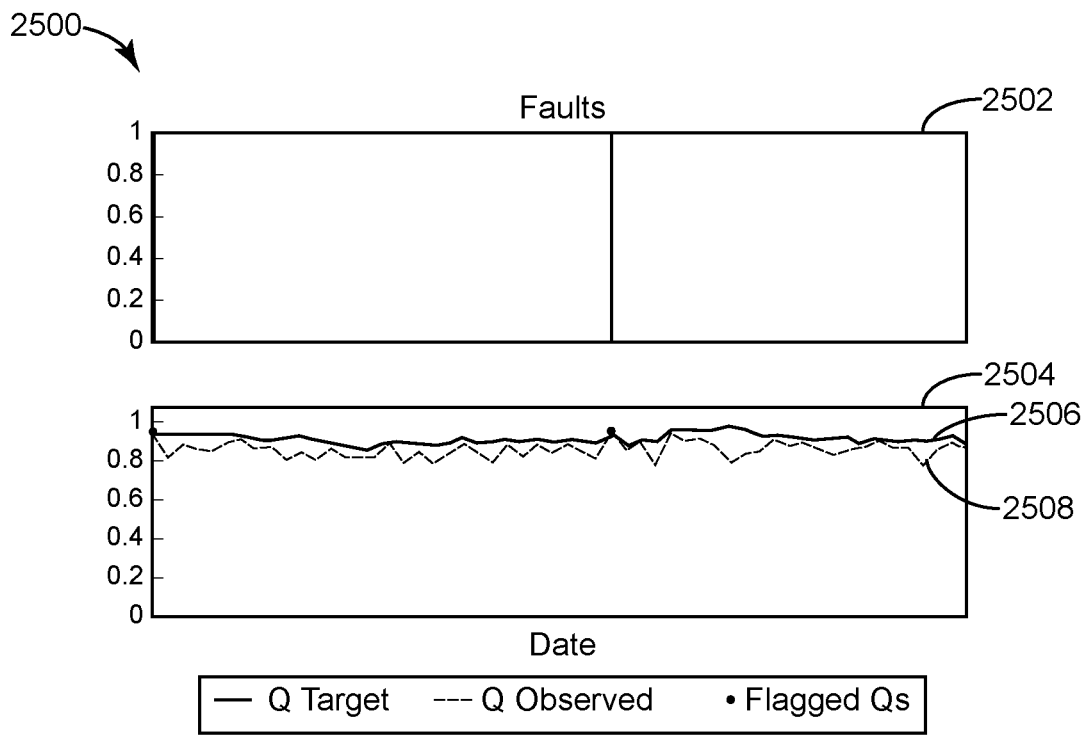
FIG. 25 is two graphs of data illustrating a Q ratio over time calculated by the weekend versus weekday process and indicating days that the Q ratio exceeds an adaptive threshold for the fourth customer, according to an exemplary embodiment.

Referring now to FIG. 25, graphs of data 2500 illustrating a Q ratio trend 2508 over time calculated by a weekend versus weekday process and indicating days that Q ratio trend 2508 exceeds an adaptive threshold trend 2506 for customer 4 is shown, according to an exemplary embodiment. Q ratio trend 2508 can be generated by occupancy comparison module 626. Similar to graphs of data 1200, graphs of data 2500 is shown to include a fault graph 2502 and a Q ratio graph 2504. Each graph 2502 and 2504 illustrates calculated faults over time in a manner similar to fault graph 1202 and Q ratio graph 1204, shown and discussed with reference to FIG. 12.

Figure 26:
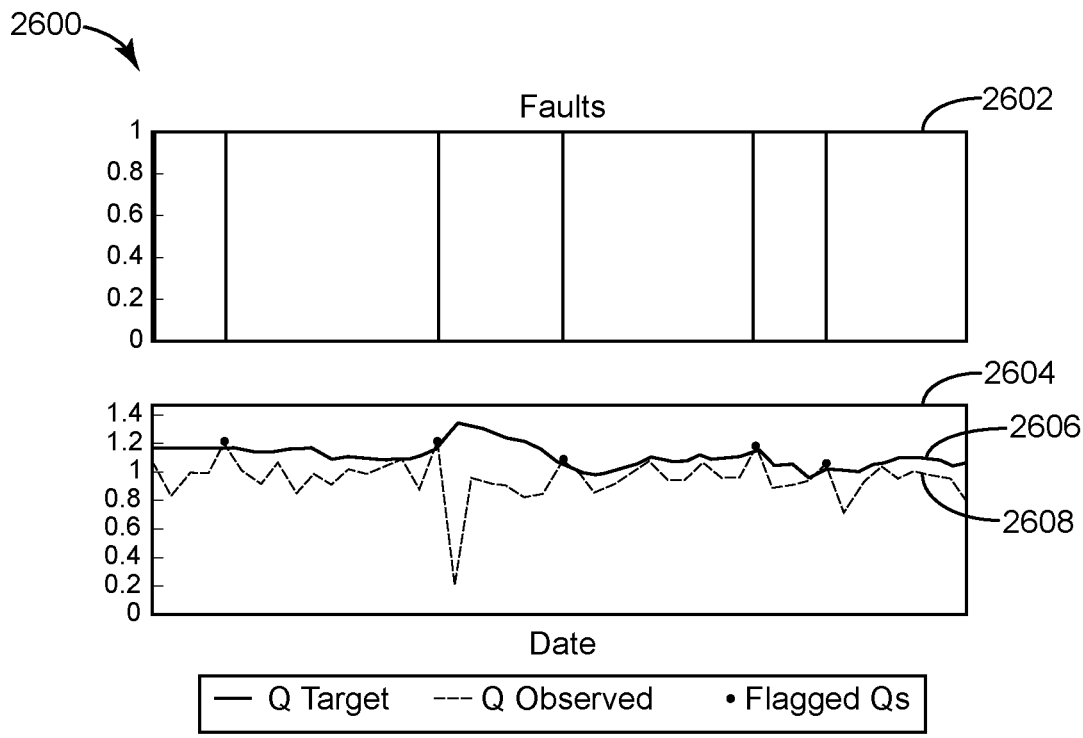
FIG. 26 is two graphs of data illustrating a Q ratio over time calculated by the weekend versus weekday process and indicating days that the Q ratio exceeds an adaptive threshold for the fifth, according to an exemplary embodiment.

Referring now to FIG. 26, graphs of data 2600 illustrating a Q ratio trend 2608 over time calculated by a weekend versus weekday process and indicating days that Q ratio trend 2608 exceeds an adaptive threshold trend 2606 for customer 5 is shown, according to an exemplary embodiment. Q ratio trend 2608 can be generated by occupancy comparison module 626. Similar to graphs of data 1200, graphs of data 2600 is shown to include a fault graph 2602 and a Q ratio graph 2604. Each graph 2602 and 2604 illustrates calculated faults over time in a manner similar to fault graph 1202 and Q ratio graph 1204, shown and discussed with reference to FIG. 12.

Figure 27:
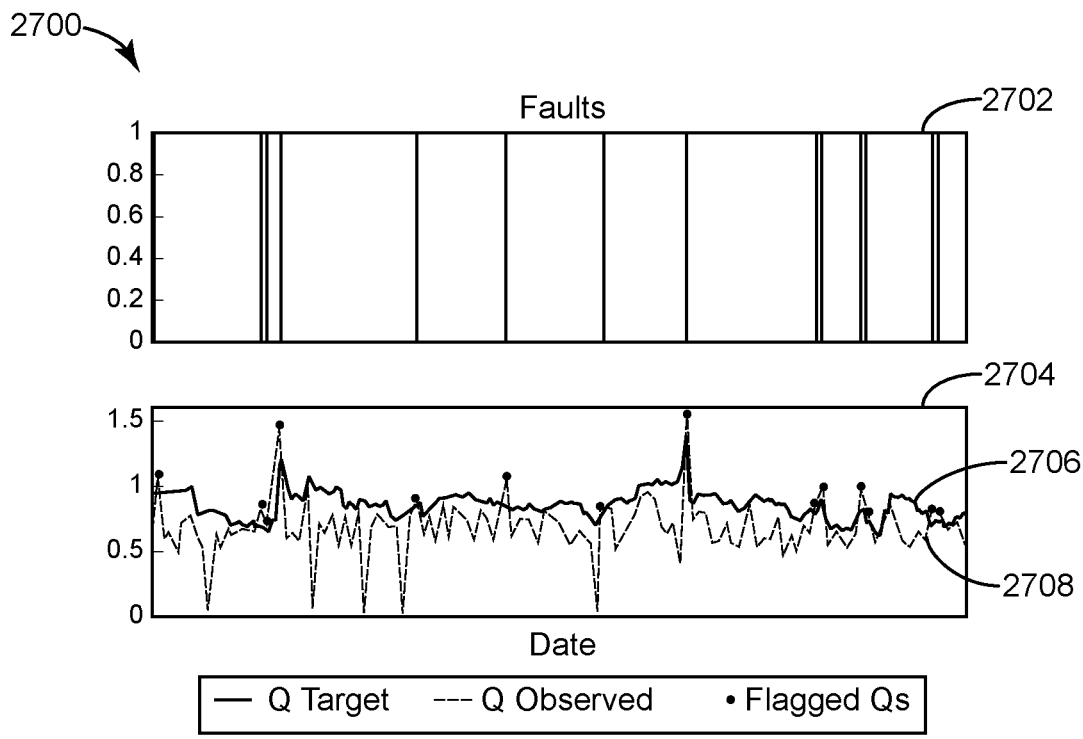
FIG. 27 is two graphs of data illustrating a Q ratio over time calculated by the weekend versus weekday process and indicating days that the Q ratio exceeds an adaptive threshold for the sixth, according to an exemplary embodiment.

Referring now to FIG. 27, graphs of data 2700 illustrating a Q ratio trend 2708 over time calculated by a weekend versus weekday process and indicating days that Q ratio trend 2708 exceeds an adaptive threshold trend 2706 for customer 6 is shown, according to an exemplary embodiment. Q ratio trend 2708 can be generated by occupancy comparison module 626. Similar to graphs of data 1200, graphs of data 2700 is shown to include a fault graph 2702 and a Q ratio graph 2704. Each graph 2702 and 2704 illustrates calculated faults over time in a manner similar to fault graph 1202 and Q ratio graph 1204, shown and discussed with reference to FIG. 12.

Figure 28:
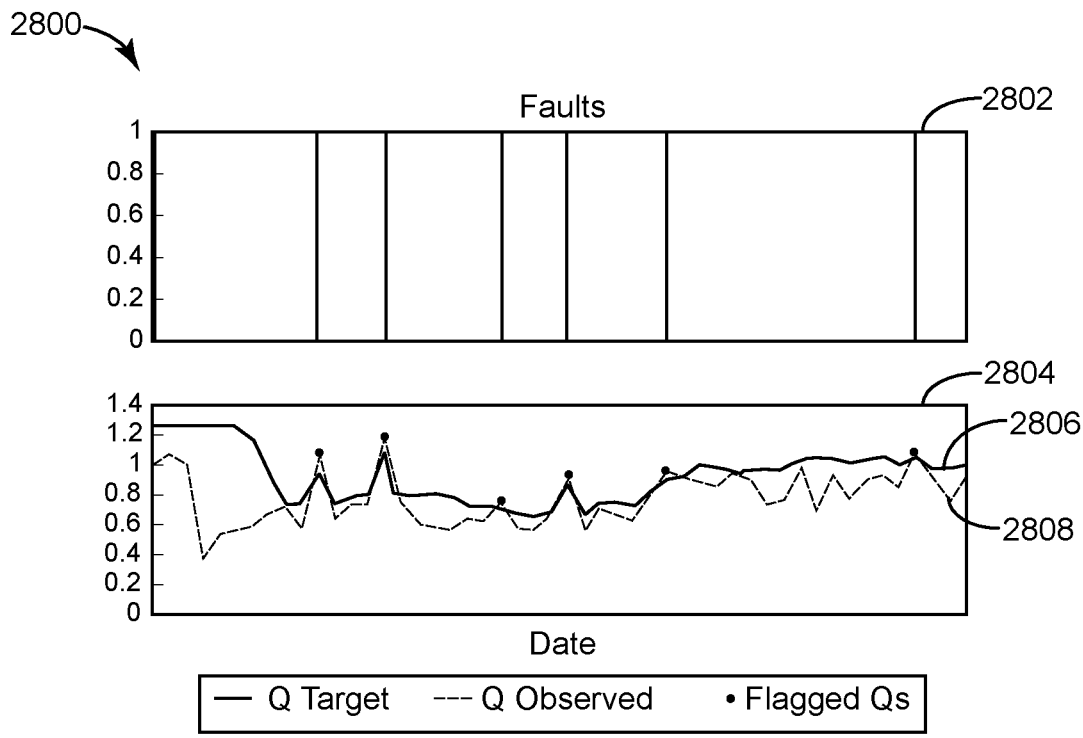
FIG. 28 is two graphs of data illustrating a Q ratio over time calculated by the weekend versus weekday process and indicating days that the Q ratio exceeds an adaptive threshold for the seventh, according to an exemplary embodiment.

Referring now to FIG. 28, graphs of data 2800 illustrating a Q ratio trend 2808 over time calculated by a weekend versus weekday process and indicating days that Q ratio trend 2808 exceeds an adaptive threshold trend 2806 for customer 7 is shown, according to an exemplary embodiment. Q ratio trend 2808 can be generated by occupancy comparison module 626. Similar to graphs of data 1200, graphs of data 2800 is shown to include a fault graph 2802 and a Q ratio graph 2804. Each graph 2802 and 2804 illustrates calculated faults over time in a manner similar to fault graph 1202 and Q ratio graph 1204, shown and discussed with reference to FIG. 12.

Figure 29:
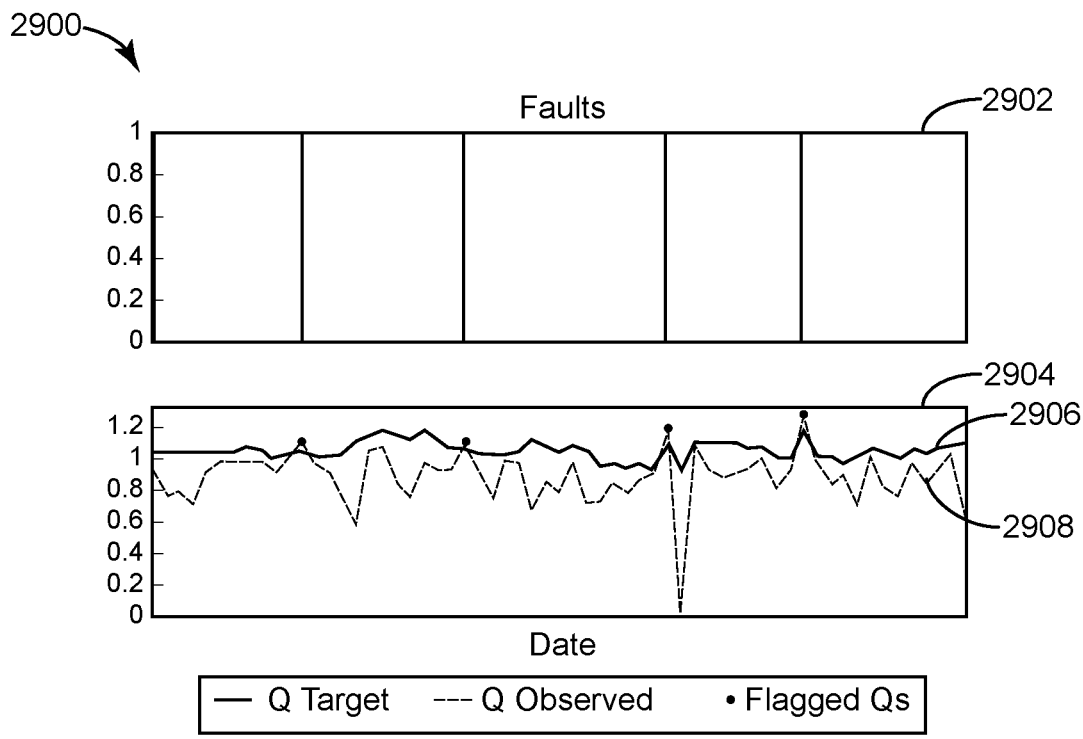
FIG. 29 is two graphs of data illustrating a Q ratio over time calculated by the weekend versus weekday process and indicating days that the Q ratio exceeds an adaptive threshold for the eighth, according to an exemplary embodiment.

Referring now to FIG. 29, graphs of data 2900 illustrating a Q ratio trend 2908 over time calculated by a weekend versus weekday process and indicating days that Q ratio trend 2908 exceeds an adaptive threshold 2906 trend for customer 8 is shown, according to an exemplary embodiment. Q ratio trend 2908 can be generated by occupancy comparison module 626. Similar to graphs of data 1200, graphs of data 2900 is shown to include a fault graph 2902 and a Q ratio graph 2904. Each graph 2902 and 2904 illustrates calculated faults over time in a manner similar to fault graph 1202 and Q ratio graph 1204, shown and discussed with reference to FIG. 12.

Figure 30:
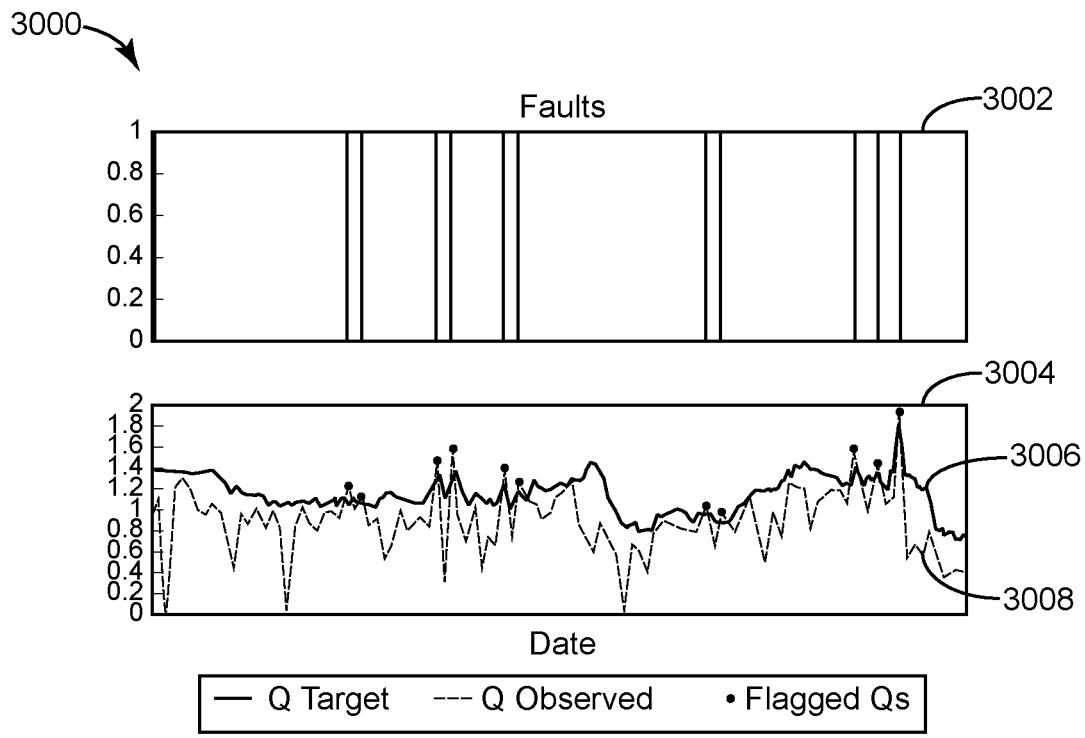
FIG. 30 is two graphs of data illustrating a Q ratio over time calculated by the weekend versus weekday process and indicating days that the Q ratio exceeds an adaptive threshold for the ninth, according to an exemplary embodiment.

Referring now to FIG. 30, graphs of data 3000 illustrating a Q ratio trend 3008 over time calculated by a weekend versus weekday process and indicating days that Q ratio trend 3008 exceeds an adaptive threshold trend 3006 for customer 9 is shown, according to an exemplary embodiment. Q ratio trend 3008 can be generated by occupancy comparison module 626. Similar to graphs of data 1200, graphs of data 3000 is shown to include a fault graph 3002 and a Q ratio graph 3004. Each graph 3002 and 3004 illustrates calculated faults over time in a manner similar to fault graph 1202 and Q ratio graph 1204, shown and discussed with reference to FIG. 12.

Figure 31:
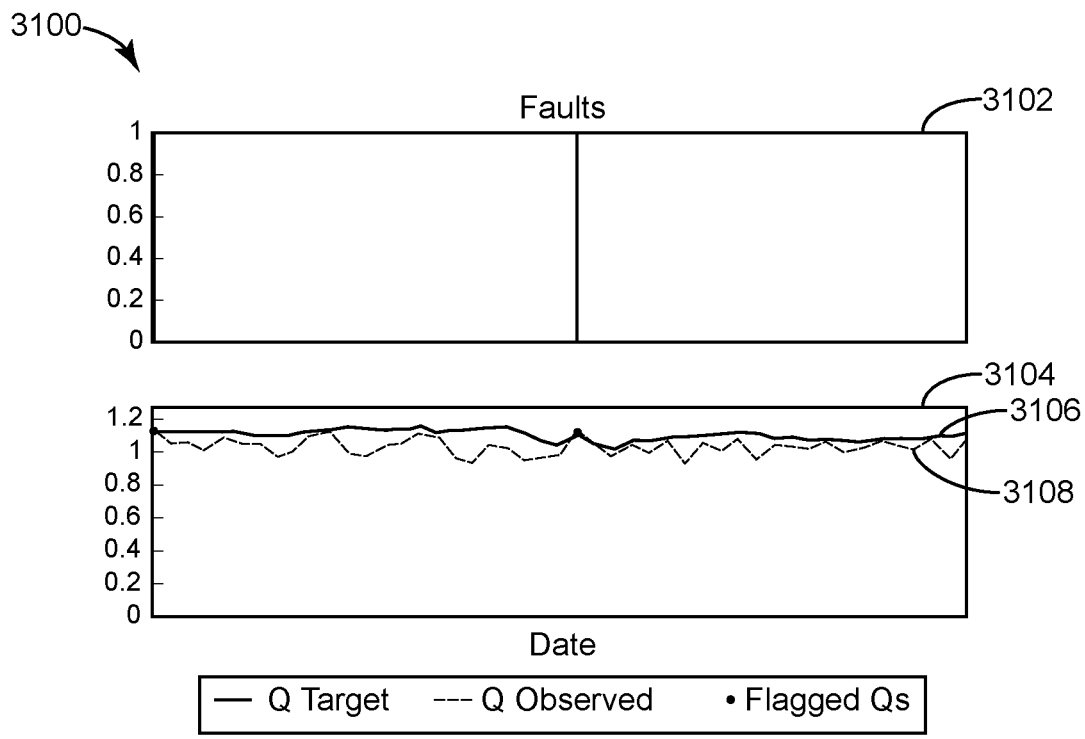
FIG. 31 is two graphs of data illustrating a Q ratio over time calculated by the weekend versus weekday process and indicating days that the Q ratio exceeds an adaptive threshold for the tenth, according to an exemplary embodiment.

Referring now to FIG. 31, graphs of data 3100 illustrating a Q ratio trend 3108 over time calculated by a weekend versus weekday process and indicating days that Q ratio trend 3108 exceeds an adaptive threshold trend 3106 for customer 10 is shown, according to an exemplary embodiment. Q ratio trend 3108 can be generated by occupancy comparison module 626. Similar to graphs of data 1200, graphs of data 3100 is shown to include a fault graph 3102 and a Q ratio graph 3104. Each graph 3102 and 3104 illustrates calculated faults over time in a manner similar to fault graph 1202 and Q ratio graph 1204, shown and discussed with reference to FIG. 12.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system, comprising one or more memory devices configured to store instructions that, when executed on one or more processors, cause the one or more processors to:
   determine an average of a minimum half of sorted energy consumption values for a first time period;
   determine an average of a maximum half of sorted energy consumption values for a second time period;
   determine a ratio of the average of the minimum half of sorted energy consumption values for the first time period to the average of the maximum half of sorted energy consumption values for the second time period;
   compare the calculated ratio to a threshold value; and
   control a second system responsive to the calculated ratio exceeding the threshold value, wherein the controlled second system controls one or more building subsystems, one or more building management system devices, or one or more parameters for controlling components of an HVAC system.

2. The building system of claim 1, wherein the first time period is an occupancy time period and the second time period is a non-occupancy time period.

3. The building system of claim 1, wherein the instructions cause the one or more processors to:
   determine a mean of a set of calculated ratios for an interval;
   determine a median absolute deviation of the calculated ratios for the interval; and
   set the threshold value based on the mean and the median absolute deviation.

4. The building system of claim 3, wherein the threshold value is further based on a scaling factor to scale the median absolute deviation based on the mean of the set of calculated ratios.

5. The building system of claim 1, wherein the instructions cause the one or more processors to:
   collect data samples from one or more building management system devices and generate a data timeseries comprising a plurality of the data samples;
   perform one or more analytics using the data timeseries and generate a results timeseries comprising a plurality of result samples indicating results of the analytics, wherein the building system further comprises a database configured to store the data timeseries and the results timeseries; and
   retrieve the data timeseries and the results timeseries from the database in response to a request for timeseries data associated with one or more variables.

6. The building system of claim 5, wherein the instructions further cause the one or more processors to generate the results timeseries by removing an effect of weather from the data timeseries.

7. The building system of claim 5, wherein the data timeseries is a resource consumption timeseries and the data samples of the data timeseries comprise at least one of electric consumption values, water consumption values, or natural gas consumption values; and
   wherein the instructions further cause the one or more processors to use the data timeseries to calculate an energy usage metric for a building associated with the data timeseries, the energy usage metric comprising at least one of energy usage intensity (EUI) or energy density.

8. The building system of claim 5, wherein the instructions further cause the one or more processors to fill one or more gaps in data of the data timeseries using values from a third time period different from the first time period and the second time period.

9. The building system of claim 8, wherein the third time period and the first time period are associated with a common characteristic.

10. A system comprising:
    a building management system in communication with one or more building management system devices of a building network,
    wherein the building management system is configured to:
    determine an average of energy consumption values for a first time period;
    determine an average of energy consumption values for a second time period;
    determine a ratio of the average energy consumption values for the first time period to the average of energy consumption values for the second time period;
    determine a mean of a set of calculated ratios for an interval;
    determine a median absolute deviation of the calculated ratios for the interval;
    determine an adaptively tunable threshold value based on the mean and the median absolute deviation;
    compare the calculated ratio to the adaptively tunable threshold value; and
    control a second system responsive to the calculated ratio exceeding the adaptively tunable threshold value, wherein the controlled second system controls one or more building subsystems, one or more building management system devices, or one or more parameters for controlling components of an HVAC system.

11. The system of claim 10, wherein the first time period is a weekend time period and the second time period is a weekday time period.

12. The system of claim 10, wherein the adaptively tunable threshold value is further based on a scaling factor to scale the median absolute deviation based on the mean of the set of calculated ratios.

13. The system of claim 10, wherein the building management system is further configured to:
    collect data samples from the one or more building management system devices and generate a data timeseries comprising a plurality of the data samples;
    perform one or more analytics using the data timeseries and generate a results timeseries comprising a plurality of result samples indicating results of the analytics, wherein the system further comprises a database configured to store the data timeseries and the results timeseries; and
    retrieve the data timeseries and the results timeseries from the database in response to a request for timeseries data associated with one or more variables.

14. The system of claim 13, wherein the building management system is further configured to generate the results timeseries by removing an effect of weather from the data timeseries.

15. The system of claim 13, wherein the data timeseries is a resource consumption timeseries and the data samples of the data timeseries comprise at least one of electric consumption values, water consumption values, or natural gas consumption values; and
wherein the building management system is further configured to use the data timeseries to calculate an energy usage metric for a building associated with the data timeseries, the energy usage metric comprising at least one of energy usage intensity (EUI) or energy density.

16. The system of claim 13, wherein the building management system is further configured to fill one or more gaps in data of the data timeseries using values from a third time period different from the first time period and the second time period.

17. A method conducted by a processing circuit of a building management system, comprising:
determining, by the processing circuit, an average of a minimum half of sorted energy consumption values for a first time period;
determining, by the processing circuit, an average of a maximum half of sorted energy consumption values for a second time period;
determining, by the processing circuit, a ratio of the average of the minimum half of sorted energy consumption values for the first time period to the average of the maximum half of sorted energy consumption values for the second time period;
comparing, by the processing circuit, the determined ratio to a threshold value; and
controlling, by the processing circuit, a system responsive to the determined ratio exceeding the adaptively tunable threshold value, wherein the controlled second system controls one or more building subsystems, one or more building management system devices, or one or more parameters for controlling components of an HVAC system.

18. The method of claim 17, further comprising:
collecting, by the processing circuit, data samples from building management system devices of the building management system and generating a data timeseries comprising a plurality of the data samples;
performing, by the processing circuit, one or more analytics using the data timeseries;
generating, by the processing circuit, a results timeseries comprising a plurality of result samples indicating results of the analytics;
storing, by the processing circuit, the data timeseries and the results timeseries;
retrieving, by the processing circuit, the data timeseries and the results timeseries from a database in response to a request for timeseries data associated with the one or more variables,
wherein determining the average of a minimum half of sorted energy consumption values for the first time period and the average of a maximum half of sorted energy consumption values for the second time period is performed using samples of the data timeseries.

* * * * *